(12) United States Patent
Miyazaki et al.

(10) Patent No.: US 12,405,036 B2
(45) Date of Patent: Sep. 2, 2025

(54) HEAT TRANSFER METHOD

(71) Applicant: DAIKIN INDUSTRIES, LTD., Osaka (JP)

(72) Inventors: Takeru Miyazaki, Osaka (JP); Teruo Kido, Osaka (JP); Takuro Yamada, Osaka (JP); Atsushi Yoshimi, Osaka (JP); Ikuhiro Iwata, Osaka (JP); Eiji Kumakura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 237 days.

(21) Appl. No.: 18/125,299

(22) Filed: Mar. 23, 2023

(65) Prior Publication Data

US 2023/0228464 A1    Jul. 20, 2023

Related U.S. Application Data

(63) Continuation of application No. PCT/JP2021/035915, filed on Sep. 29, 2021.

(30) Foreign Application Priority Data

Sep. 30, 2020 (JP) .................. 2020-165352

(51) Int. Cl.
 *F25B 15/00* (2006.01)
 *F25B 41/40* (2021.01)
 *F25B 49/04* (2006.01)
(52) U.S. Cl.
 CPC ............ *F25B 15/002* (2013.01); *F25B 41/40* (2021.01); *F25B 49/043* (2013.01)

(58) Field of Classification Search
 CPC ............................ F25B 25/005; F25B 15/002
 See application file for complete search history.

(56) References Cited

FOREIGN PATENT DOCUMENTS

| JP | 4-327790 A | | 11/1992 |
|---|---|---|---|
| JP | 2002-283223 A | | 10/2002 |
| JP | 2005-29591 A | | 2/2005 |
| JP | 2006-219557 A | | 8/2006 |
| JP | 2007107773 A | * | 4/2007 |

(Continued)

OTHER PUBLICATIONS

International Search Report (PCT/ISA/210) issued in PCT/JP2021/035915, dated Nov. 9, 2021 with English translation.

(Continued)

*Primary Examiner* — Lionel Nouketcha
(74) *Attorney, Agent, or Firm* — Birch, Stewart, Kolasch & Birch, LLP

(57) ABSTRACT

A heat transfer method uses a heat transfer system including: a heat source unit in which heat is exchanged between a heat transfer medium and a heat source; a utilization unit in which heat is exchanged between the heat transfer medium and a temperature adjustment target; and a first flow path and a second flow path that connect the heat source unit and the utilization unit. The heat transfer medium flows through the first flow path from the heat source unit to the utilization unit, and flows through the second flow path from the utilization unit to the heat source unit. In the heat transfer method, inorganic hydrate slurry, in which an inorganic hydrate that absorbs heat when dissolved in water is mixed with water, is used as the heat transfer medium.

20 Claims, 11 Drawing Sheets

(56) References Cited

FOREIGN PATENT DOCUMENTS

| | | |
|---|---|---|
| JP | 2007-239697 A | 9/2007 |
| JP | 5076554 B2 | 11/2012 |
| WO | WO 2011/099629 A1 | 8/2011 |

OTHER PUBLICATIONS

Extended European Search Report for European Application No. 21875712.8, dated Feb. 26, 2024.
International Preliminary Report on Patentability and English translation of the Written Opinion of the International Searching Authority for International Application No. PCT/JP2021/035915, dated Apr. 13, 2023.

* cited by examiner

HEAT TRANSFER METHOD

CROSS REFERENCE TO RELATED APPLICATIONS

This application is a Continuation of PCT International Application No. PCT/JP2021/035915, filed on Sep. 29, 2021, which claims priority under 35 U.S.C. 119(a) to Patent Application No. JP 2020-165352, filed in Japan on Sep. 30, 2020, all of which are hereby expressly incorporated by reference into the present application.

TECHNICAL FIELD

The present disclosure relates to a heat transfer method using a heat transfer system.

BACKGROUND ART

A heat transfer method using a heat transfer system that utilizes water as a heat transfer medium, such as PTL 1 (International Publication No. 2011/099629), is known. A heat transfer method in which water is used as a heat transfer medium instead of a refrigerant, such as an alternative chlorofluorocarbon, is a preferable heat transfer method from a viewpoint of global warming countermeasures.

SUMMARY

A heat transfer method according to a first aspect is a heat transfer method using a heat transfer system. The heat transfer system includes a heat source unit, a utilization unit, a first flow path, and a second flow path. In the heat source unit, heat is exchanged between a heat transfer medium and a heat source. In the utilization unit, heat is exchanged between the heat transfer medium and a temperature adjustment target. The first flow path connects the heat source unit and the utilization unit. The heat transfer medium flows through the first flow path from the heat source unit to the utilization unit. The second flow path connects the heat source unit and the utilization unit. The heat transfer medium flows through the second flow path from the utilization unit to the heat source unit. The heat transfer method includes using, as the heat transfer medium, inorganic hydrate slurry in which an inorganic hydrate that absorbs heat when dissolved in water is mixed with water. The heat transfer method includes controlling the heat transfer system so that a temperature of the heat transfer medium flowing through the first flow path and a temperature of the heat transfer medium flowing through the second flow path becomes equal to or below a melting point of the inorganic hydrate. Further, the heat transfer method includes making an amount of the inorganic hydrate dissolved per unit mass of water in the heat transfer medium flowing through the first flow path different from an amount of the inorganic hydrate dissolved per unit mass of water in the heat transfer medium flowing through the second flow path.

DESCRIPTION OF EMBODIMENTS

An embodiment of a heat transfer method of the present disclosure will be described below.

(1) Air Conditioning System

Figure 1:
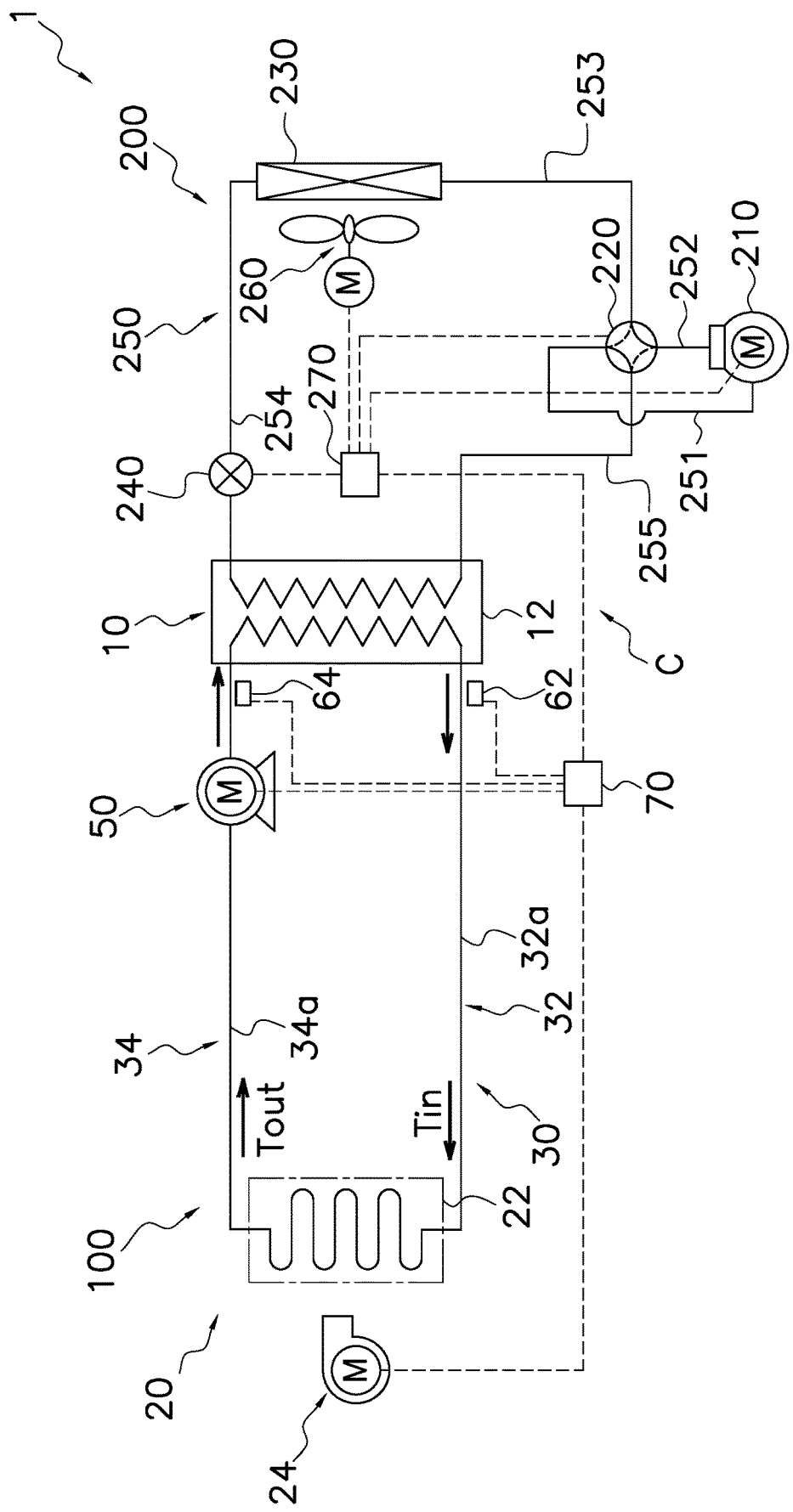
FIG. 1 is a schematic configuration diagram of an air conditioning system including a heat transfer subsystem (heat transfer system) used in a heat transfer method according to an embodiment.

An air conditioning system 1 including a heat transfer subsystem 100 used in the heat transfer method of the present disclosure will be described with reference to FIG. 1. FIG. 1 is a schematic configuration diagram of the air conditioning system 1. The heat transfer subsystem 100 is an example of a heat transfer system in the claims.

The air conditioning system 1 is a system that cools an air conditioning target space by cooling the temperature of air in the air conditioning target space as a temperature adjustment target, and heats the air conditioning target space by heating the temperature of the air in the air conditioning target space as a temperature adjustment target. In the present embodiment, the air conditioning system 1 is a system that cools and heats an air conditioning target space, but is not limited thereto. For example, the air conditioning system 1 may be a system dedicated to cooling an air conditioning target space.

Further, the use of the heat transfer subsystem 100 is not limited to the air conditioning system 1. For example, the heat transfer subsystem 100 may be utilized as a system that transfers heat from a heat source device, such as a vapor compression refrigeration cycle device in a cooling system that cools various devices.

The air conditioning system 1 mainly includes the heat transfer subsystem 100 and a refrigeration cycle subsystem 200.

The heat transfer subsystem 100 includes a medium circuit 30 through which a heat transfer medium circulates. The heat transfer subsystem 100 circulates the heat transfer medium in the medium circuit 30 to transfer heat. Specifically, the heat transfer subsystem 100 transfers heat supplied from the refrigeration cycle subsystem 200 to a temperature adjustment target (air in an air conditioning target space in the present embodiment) of the heat transfer subsystem 100 by the heat transfer medium. In a case where the air conditioning system 1 cools the air conditioning target space, the heat transfer subsystem 100 uses the heat transfer medium to transfer cold heat supplied from the refrigeration cycle subsystem 200 to the temperature adjustment target of the heat transfer subsystem 100. In a case where the air conditioning system 1 heats the air conditioning target space, the heat transfer subsystem 100 uses the heat transfer medium to transfer hot heat supplied from the refrigeration cycle subsystem 200 to the temperature adjustment target of the heat transfer subsystem 100.

The refrigeration cycle subsystem 200 utilizes a vapor compression refrigeration cycle to cool or heat a refrigerant, and supplies cold heat or hot heat of the refrigerant to the heat transfer subsystem 100. In the present embodiment, the refrigeration cycle subsystem 200 utilizes air as a heat source. However, the present invention is not limited thereto, and for example, the refrigeration cycle subsystem 200 may utilize liquid, such as water as a heat source.

The refrigerant used in the refrigeration cycle subsystem 200 is, for example, a hydrofluorocarbon (HFC)-based refrigerant, such as R32, but the type of the refrigerant is not limited thereto. The hydrofluorocarbon (HFC)-based refrigerant is a refrigerant that has ozone depletion potential of zero, but has a relatively high global warming potential (GWP).

(2) Detailed Configuration

The refrigeration cycle subsystem 200 and the heat transfer subsystem 100 will be described in detail.

(2-1) Refrigeration Cycle Subsystem

The refrigeration cycle subsystem 200 will be described with reference to FIG. 1.

The refrigeration cycle subsystem 200 is a system that serves as a heat source of a heat source unit 10 of the heat transfer subsystem 100 described later. Note that the refrigeration cycle subsystem 200 and the heat source unit 10 of the heat transfer subsystem 100 are preferably arranged relatively close to each other in order to reduce lengths of refrigerant pipes and reduce an amount of refrigerant used.

As illustrated in FIG. 1, the refrigeration cycle subsystem 200 mainly includes a compressor 210, a flow path switching mechanism 220, a first heat exchanger 230, an expansion mechanism 240, a fan 260, and a control device 270.

In the refrigeration cycle subsystem 200, the compressor 210, the flow path switching mechanism 220, the first heat exchanger 230, the expansion mechanism 240, and a heat source heat exchanger 12 of the heat source unit 10 of the heat transfer subsystem 100, which will be described later, are connected by refrigerant pipes to constitute a refrigerant circuit 250 (see FIG. 1). The refrigerant pipes that connect various components of the refrigeration cycle subsystem 200 include a suction pipe 251, a discharge pipe 252, a first gas refrigerant pipe 253, a liquid refrigerant pipe 254, and a second gas refrigerant pipe 255 (see FIG. 1). The suction pipe 251 connects a suction port (not illustrated) of the compressor 210 and the flow path switching mechanism 220. The discharge pipe 252 connects a discharge port (not illustrated) of the compressor 210 and the flow path switching mechanism 220. The first gas refrigerant pipe 253 is a pipe that connects the flow path switching mechanism 220 and the gas side of the first heat exchanger 230. The liquid refrigerant pipe 254 is a pipe that connects the liquid side of the first heat exchanger 230 and the liquid side of the heat source heat exchanger 12 of the heat source unit 10. The expansion mechanism 240 is arranged in the liquid refrigerant pipe 254. The second gas refrigerant pipe 255 is a pipe that connects the flow path switching mechanism 220 and the gas side of the heat source heat exchanger 12 of the heat source unit 10.

The compressor 210, the flow path switching mechanism 220, the first heat exchanger 230, the expansion mechanism 240, and the fan 260 are installed outdoors or the like as a unit housed in a single housing, for example. Alternatively, in addition to the compressor 210, the flow path switching mechanism 220, the first heat exchanger 230, the expansion mechanism 240, and the fan 260, the heat exchanger 12 of the heat source unit 10 of the heat transfer subsystem 100 may also be housed in a single housing.

(2-1-1) Compressor

The compressor 210 sucks a low-pressure refrigerant in a refrigeration cycle through the suction pipe 251, compresses the refrigerant by a compression mechanism (not illustrated), and discharges a high-pressure refrigerant in the refrigeration cycle after compression through the discharge pipe 252.

The compressor 210 is, for example, a scroll compressor. However, the type of the compressor 210 is not limited to the scroll type. For example, the compressor 210 may be a rotary compressor, a screw compressor, a turbo compressor, or the like. The compressor 210 is a variable capacity compressor, but may be a constant capacity compressor, for example.

(2-1-2) Flow Path Switching Mechanism

The flow path switching mechanism 220 is a mechanism that switches a flow direction of the refrigerant in the refrigerant circuit 250 in accordance with an operating mode of the air conditioning system 1. The operating mode of the air conditioning system 1 includes a cooling mode and a heating mode.

In the present embodiment, the flow path switching mechanism 220 is a four-way switching valve. However, the flow path switching mechanism 220 is not limited to the four-way switching valve, and for example, may be configured to achieve the following switching of the flow direction of the refrigerant by combining a plurality of electromagnetic valves and pipes.

In a case where the operating mode of the air conditioning system 1 is the cooling mode, the flow path switching mechanism 220 switches the flow direction of the refrigerant in the refrigerant circuit 250 so that the refrigerant discharged by the compressor 210 is sent to the first heat exchanger 230. Specifically, in the cooling mode, the flow path switching mechanism 220 causes the suction pipe 251 and the second gas refrigerant pipe 255 to communicate with each other, and causes the discharge pipe 252 and the first gas refrigerant pipe 253 to communicate with each other (see solid lines in the flow path switching mechanism 220 in FIG. 1).

Figure 2:
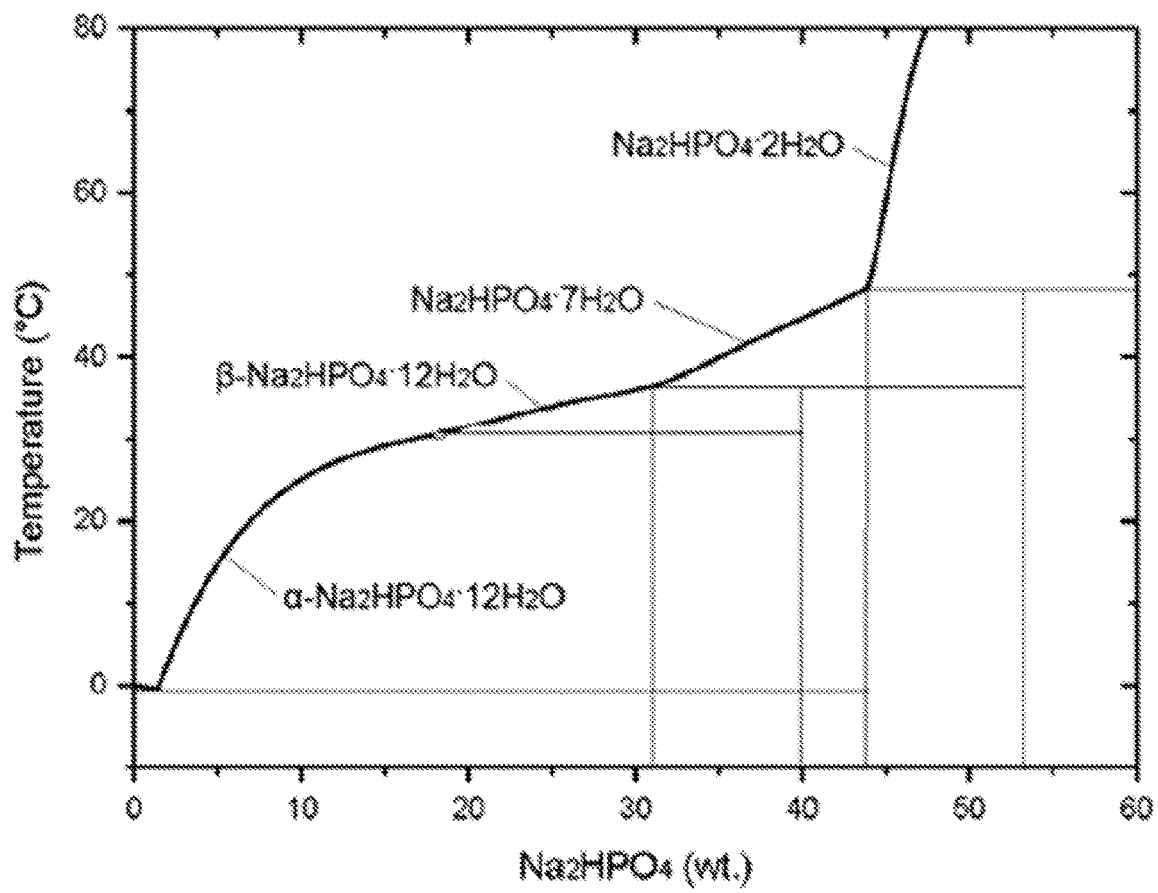
FIG. 2 is a phase diagram of disodium hydrogenphosphate used as a heat transfer medium in the heat transfer method according to the embodiment.

In a case where the operating mode of the air conditioning system 1 is the heating mode, the flow path switching mechanism 220 switches the flow direction of the refrigerant in the refrigerant circuit 250 so that the refrigerant discharged by the compressor 210 is sent to the heat source heat exchanger 12 of the heat source unit 10 of the heat transfer subsystem 100. Specifically, in the heating mode, the flow path switching mechanism 220 causes the suction pipe 251 and the first gas refrigerant pipe 253 to communicate with each other, and causes the discharge pipe 252 and the second gas refrigerant pipe 255 to communicate with each other (see broken lines in the flow path switching mechanism 220 in FIG. 2).

(2-1-3) First Heat Exchanger

The first heat exchanger 230 is a heat exchanger that causes heat exchange between air as a heat source around the first heat exchanger 230 and the refrigerant flowing inside the first heat exchanger 230. The first heat exchanger 230 is, for example, a cross-fin type fin-and-tube heat exchanger, but the type is not limited thereto. The first heat exchanger 230 functions as a condenser (radiator) when the operating mode of the air conditioning system 1 is the cooling mode. Further, the first heat exchanger 230 functions as an evaporator when the operating mode of the air conditioning system 1 is the heating mode.

(2-1-4) Expansion Mechanism

The expansion mechanism 240 is a mechanism that expands the refrigerant flowing through the liquid refrigerant pipe 254 to adjust the pressure and the flow rate of the refrigerant. In the present embodiment, the expansion mechanism 240 is an electronic expansion valve whose opening degree is adjustable. Note that the expansion mechanism 240 is not limited to the electronic expansion valve. For example, the expansion mechanism 240 may be a temperature automatic expansion valve having a temperature sensing cylinder, or may be a capillary tube.

(2-1-5) Fan

The fan 260 is a mechanism that generates an air flow so that air passes through the first heat exchanger 230 in order to promote heat exchange between the refrigerant and the air in the first heat exchanger 230. The fan 260 is, for example, a propeller fan, but the type is not limited thereto.

(2-1-6) Control Device

The control device 270 is a device that controls operations of various components of the refrigeration cycle subsystem 200.

The control device 270 includes various electric circuits and electronic circuits, a microcomputer including a CPU and a memory in which a program executed by the CPU is stored, and the like, as a configuration for controlling the operations of various components of the refrigeration cycle subsystem 200. For example, the control device 270 may be a single device, or a plurality of devices may cooperate to function as the control device 270.

The control device 270 is electrically connected to the compressor 210, the flow path switching mechanism 220, the expansion mechanism 240, and the fan 260. Further, the control device 270 is connected to various sensors (a temperature sensor that measures a temperature of the refrigerant, a pressure sensor that measures a pressure of the refrigerant, and the like) provided in each component of the refrigeration cycle subsystem 200 so as to be able to acquire signals relating to measurement values of the sensors. Further, the control device 270 of the refrigeration cycle subsystem 200 is communicably connected to a control device 70 of the heat transfer subsystem 100.

Control of the operations of various components of the refrigeration cycle subsystem 200 by the control device 270 will be described later.

(2-2) Heat Transfer Subsystem

The heat transfer subsystem 100 is an example of a heat transfer system in the claims.

The heat transfer subsystem 100 mainly includes the heat source unit 10, a utilization unit 20, a first flow path 32, a second flow path 34, a pump 50, a first temperature sensor 62, a second temperature sensor 64, and the control device 70. Only one utilization unit 20 is illustrated in FIG. 1, but the present invention is not limited thereto. The heat transfer subsystem 100 may include a plurality of utilization units 20, for example. The first flow path 32 and the second flow path 34 each connect the heat source unit 10 and the utilization unit 20. The medium circuit 30 through which the heat transfer medium circulates is formed by connecting the heat source unit 10 and the utilization unit 20 by the first flow path 32 and the second flow path 34.

The function of the heat transfer subsystem 100 will be described. The heat transfer subsystem 100 is a system that transfers heat (cold heat or hot heat) from the heat source unit 10 to the utilization unit 20 by circulating the heat transfer medium in the medium circuit 30.

The heat transfer subsystem 100 of the present embodiment uses, instead of water as the heat transfer medium, inorganic hydrate slurry in which an inorganic hydrate is mixed with water. The inorganic hydrate mixed with water is in particular an inorganic hydrate that absorbs heat when dissolved in water. The heat transfer medium used in the heat transfer subsystem 100 will be described in detail later.

The heat source unit 10, the utilization unit 20, the first flow path 32, the second flow path 34, the pump 50, the first temperature sensor 62, the second temperature sensor 64, and the control device 70 will be described in detail.

(2-2-1) Heat Source Unit

The heat source unit 10 is a unit that receives a supply of heat from the refrigeration cycle subsystem 200 (from the refrigerant of the refrigeration cycle subsystem 200) serving as a heat source.

The heat source unit 10 mainly includes the heat source heat exchanger 12.

In the present embodiment, the heat source heat exchanger 12 is a plate heat exchanger. However, the type of the heat source heat exchanger 12 is not limited to the plate heat exchanger. It is sufficient that the type of the heat exchanger is appropriately selected as long as heat can be exchanged between the refrigerant and the heat transfer medium.

The liquid refrigerant pipe 254, the second gas refrigerant pipe 255, a first pipe 32a forming the first flow path 32, and a second pipe 34a forming the second flow path 34 are connected to the heat source heat exchanger 12.

The heat source heat exchanger 12 functions as an evaporator of the refrigerant when the operating mode of the air conditioning system 1 is the cooling mode, and functions as a condenser of the refrigerant when the operating mode of the air conditioning system 1 is the heating mode. In other words, when the operating mode of the air conditioning system 1 is the cooling mode, the refrigerant flows into the heat source heat exchanger 12 from the liquid refrigerant pipe 254 in a gas-liquid two-phase state, cools the heat transfer medium, evaporates in the heat source heat exchanger 12 to become a refrigerant gas of a gas phase, and flows out to the second gas refrigerant pipe 255. On the other hand, when the operating mode of the air conditioning system 1 is the heating mode, the refrigerant of a gas phase flows into the heat source heat exchanger 12 from the second gas refrigerant pipe 255, heats the heat transfer medium, condenses in the heat source heat exchanger 12 to become a refrigerant of a liquid phase, and flows out to the liquid refrigerant pipe 254.

The heat transfer medium flows from the second pipe 34a into the heat source heat exchanger 12 of the heat source unit 10, and flows out from the first pipe 32a. When the operating mode of the air conditioning system 1 is the cooling mode, the heat transfer medium that has flowed into the heat source heat exchanger 12 from the second pipe 34a is cooled by the refrigerant, and flows out to the first pipe 32a. When the operating mode of the air conditioning system 1 is the heating mode, the heat transfer medium that has flowed into the heat source heat exchanger 12 from the second pipe 34a is heated by the refrigerant, and flows out to the first pipe 32a.

(2-2-2) Utilization Unit

The utilization unit 20 is an air handling unit or a fan coil unit that performs air conditioning by causing heat exchange between the heat transfer medium cooled or heated by the heat source unit 10 and the air in the air conditioning target space that is a temperature adjustment target, but the type is not limited thereto.

The utilization unit 20 mainly includes a utilization heat exchanger 22 and a fan 24.

The utilization heat exchanger 22 is, for example, a plate-fin coil, but the type of the heat exchanger is not limited thereto. The fan 24 is, for example, a cross-flow fan, but the type of the fan is not limited thereto. The utilization heat exchanger 22 and the fan 24 are housed in a housing (not illustrated) of the utilization unit 20. The fan 24 takes the air in the air conditioning target space into the housing of the utilization unit 20, supplies the air to the utilization heat exchanger 22, and blows out the air that has exchanged heat with the refrigerant in the utilization heat exchanger 22 to the air conditioning target space.

The first pipe 32a forming the first flow path 32 and the second pipe 34a forming the second flow path 34 are connected to the utilization heat exchanger 22.

When the operating mode of the air conditioning system 1 is the cooling mode, the utilization heat exchanger 22 cools the air that is a temperature adjustment target with the heat transfer medium that has flowed therein from the first pipe 32a. The heat transfer medium heated (increased in temperature) in the utilization heat exchanger 22 by cooling the air flows out to the second pipe 34a.

When the operating mode of the air conditioning system 1 is the heating mode, the utilization heat exchanger 22 heats the air that is a temperature adjustment target with the heat transfer medium that has flowed therein from the first pipe 32a. The heat transfer medium cooled (reduced in temperature) in the utilization heat exchanger 22 by heating the air flows out to the second pipe 34a.

(2-2-3) First Flow Path

The first flow path 32 mainly includes the first pipe 32a forming the first flow path 32. The first flow path 32 is a flow path for the heat transfer medium and connects the heat source unit 10 and the utilization unit 20. The heat transfer medium flows through the first flow path 32 from the heat source unit 10 to the utilization unit 20.

When the operating mode of the air conditioning system 1 is the cooling mode, the temperature of the heat transfer medium flowing through the first flow path 32 is lower than the temperature of the heat transfer medium flowing through the second flow path 34. When the operating mode of the air conditioning system 1 is the heating mode, the temperature of the heat transfer medium flowing through the first flow path 32 is higher than the temperature of the heat transfer medium flowing through the second flow path 34.

(2-2-4) Second Flow Path

The second flow path 34 mainly includes the second pipe 34a forming the second flow path 34. The second flow path 34 is a flow path for the heat transfer medium and connects the heat source unit 10 and the utilization unit 20. The heat transfer medium flows through the second flow path 34 from the utilization unit 20 to the heat source unit 10.

Note that the diameter of the first pipe 32a is preferably larger than the diameter of the second pipe 34a. The reason why the diameter of the first pipe 32a is preferably larger than the diameter of the second pipe 34a, and specific examples of the dimensions of the pipes used for the first pipe 32a and the second pipe 34a will be described later.

(2-2-5) Pump

The pump 50 is a pump that circulates the heat transfer medium in the medium circuit 30. In other words, the pump 50 is a pump that sends the heat transfer medium from the heat source unit 10 to the utilization unit 20, and returns the heat transfer medium from the utilization unit 20 to the heat source unit 10.

In the present embodiment, the pump 50 is arranged in the second flow path 34. However, the present invention is not limited thereto, and for example, the pump 50 may be arranged in the first flow path 32.

The pump 50 is a variable flow rate inverter pump, for example. However, the present invention is not limited thereto, and the pump 50 may be a constant-speed pump, for example. It is sufficient that the type of the pump 50 is appropriately selected.

(2-2-6) First Temperature Sensor and Second Temperature Sensor

The first temperature sensor 62 and the second temperature sensor 64 are temperature sensors that measure the temperature of the heat transfer medium flowing through the medium circuit 30.

The first temperature sensor 62 is installed in the vicinity of a connection portion of the first flow path 32 with the heat source heat exchanger 12 of the heat source unit 10, and measures the temperature of the heat transfer medium flowing out from the heat source heat exchanger 12. The temperature of the heat transfer medium detected by the first temperature sensor 62 is equal to the temperature of the heat transfer medium flowing into the utilization heat exchanger 22 of the utilization unit 20 if the heat loss in the first flow path 32 is minute. Note that the installation location of the first temperature sensor 62 is not limited to the exemplified location as long as the temperature of the heat transfer medium flowing into the utilization heat exchanger 22 of the utilization unit 20 can be grasped.

The second temperature sensor 64 is arranged in the vicinity of a connection portion of the second flow path 34 with the heat source heat exchanger 12 of the heat source unit 10, and measures the temperature of the heat transfer medium flowing into the heat source heat exchanger 12. The temperature of the heat transfer medium detected by the second temperature sensor 64 is equal to the temperature of the heat transfer medium flowing out from the utilization heat exchanger 22 of the utilization unit 20 if the heat loss in the second flow path 34 is minute. Note that the installation location of the second temperature sensor 64 is not limited to the exemplified location as long as the temperature of the heat transfer medium flowing out from the utilization heat exchanger 22 of the utilization unit 20 can be grasped.

(2-2-7) Control Device

The control device 70 is a device that controls operations of various components of the heat transfer subsystem 100.

The control device 70 includes various electric circuits and electronic circuits, a microcomputer including a CPU and a memory in which a program executed by the CPU is stored, and the like, as a configuration for controlling the operations of various components of the heat transfer subsystem 100. For example, the control device 70 may be a single device, or a plurality of devices may cooperate to function as the control device 70.

The control device 70 is electrically connected to the fan 24 and the pump 50. Further, the control device 70 is connected to various sensors that are provided in each component of the heat transfer subsystem 100 and that include the first temperature sensor 62 and the second temperature sensor 64 so as to be able to acquire signals relating to measurement values of the sensors. Further, the control device 70 of the heat transfer subsystem 100 is communicably connected to the control device 270 of the refrigeration cycle subsystem 200.

Control of the operations of various components of the heat transfer subsystem 100 by the control device 70 will be described later.

(3) Control of Air Conditioning System

The control device 270 of the refrigeration cycle subsystem 200 and the control device 70 of the heat transfer subsystem 100 cooperate with each other to control the operation of each component of the air conditioning system 1 as described below. Note that the control device 270 and the control device 70 are separate devices here, but the present invention is not limited thereto. For example, the operation of each component of the air conditioning system 1 may be controlled by a single control device. Hereinafter, in some cases, the control device 270 and the control device 70 are collectively referred to as a control device C.

The control device 270 mainly controls the compressor 210, the flow path switching mechanism 220, the expansion mechanism 240, and the fan 260 as described above. The control device 70 mainly controls the fan 24 and the pump 50 as described above.

During operation of the air conditioning system 1, the control device C operates the pump 50 and the fan 24 of the heat transfer subsystem 100 regardless of the cooling mode or the heating mode.

Further, in a case where the operating mode of the air conditioning system 1 is the cooling mode, the control device 270 controls the operation of the flow path switching mechanism 220 to establish the state indicated by the solid lines in FIG. 1, causes the discharge side of the compressor 210 and the gas side of the first heat exchanger 230 to communicate with each other, and causes the suction side of the compressor 210 and the gas side of the heat source heat exchanger 12 to communicate with each other. In this state, the control device 270 operates the compressor 210 and the fan 260. As a result, a low-pressure gas refrigerant in the refrigeration cycle, which is sucked from the suction pipe 251 into the compressor 210, is compressed by the compressor 210, and becomes a high-pressure gas refrigerant in the refrigeration cycle. The high-pressure gas refrigerant in the refrigeration cycle flows into the first heat exchanger 230 through the discharge pipe 252, the flow path switching mechanism 220, and the first gas refrigerant pipe 253. In the first heat exchanger 230, the high-pressure gas refrigerant in the refrigeration cycle exchanges heat with air sent by the fan 260, and thereby is condensed to become a high-pressure liquid refrigerant in the refrigeration cycle. In the refrigeration cycle, the high-pressure liquid refrigerant that has flowed out from the first heat exchanger 230 flows into the expansion mechanism 240. In the refrigeration cycle, a low-pressure refrigerant that has decompressed in the expansion mechanism 240 flows through the liquid refrigerant pipe 254, and flows into the heat source heat exchanger 12. The refrigerant that has flowed into the heat source heat exchanger 12 exchanges heat with the heat transfer medium and thereby evaporates and becomes a low-pressure gas refrigerant in the refrigeration cycle, and flows out from the heat source heat exchanger 12. The refrigerant that has flowed out from the heat source heat exchanger 12 flows through the second gas refrigerant pipe 255 and the suction pipe 251, and is sucked into the compressor 210 again.

Note that the heat transfer medium that has flowed into the heat source heat exchanger 12 from the second flow path 34 by the operation of the pump 50 exchanges heat with the refrigerant and thereby is cooled, flows through the first flow path 32, and is sent to the utilization unit 20. In the utilization heat exchanger 22 of the utilization unit 20, the heat transfer medium exchanges heat with the air in the air conditioning target space that is a temperature adjustment target, and cools the air (cools the air conditioning target space). The heat transfer medium that has passed through the utilization heat exchanger 22 and has exchanged heat with the air flows through the second flow path 34, and flows into the heat source heat exchanger 12 again.

In a case where the operating mode of the air conditioning system 1 is the cooling mode, the control device C controls the operations of the refrigeration cycle subsystem 200 and the heat transfer subsystem 100 so that the temperature (Tin described later) measured by the first temperature sensor 62 and the temperature (Tout described later) measured by the second temperature sensor 64 become predetermined temperatures. For example, the control device C appropriately adjusts the capacity of the compressor 210, the opening degree of the electronic expansion valve as the expansion mechanism 240, the number of rotations of the fan 260, the number of rotations of the pump 50, and the like so that the temperature measured by the first temperature sensor 62 and the temperature measured by the second temperature sensor 64 become predetermined temperatures.

Further, in a case where the operating mode of the air conditioning system 1 is the heating mode, the control device 270 controls the operation of the flow path switching mechanism 220 to establish the state indicated by dotted lines in FIG. 1, causes the discharge side of the compressor 210 and the gas side of the heat source heat exchanger 12 to communicate with each other, and causes the suction side of the compressor 210 and the gas side of the first heat exchanger 230 to communicate with each other. In this state, the control device 270 operates the compressor 210 and the fan 260. As a result, a low-pressure gas refrigerant in the refrigeration cycle, which is sucked from the suction pipe 251 into the compressor 210, is compressed by the compressor 210, and becomes a high-pressure gas refrigerant in the refrigeration cycle. The high-pressure gas refrigerant in the refrigeration cycle flows into the heat source heat exchanger 12 through the discharge pipe 252, the flow path switching mechanism 220, and the second gas refrigerant pipe 255. In the heat source heat exchanger 12, the high-pressure gas refrigerant in the refrigeration cycle exchanges heat with the heat transfer medium flowing through the heat source heat exchanger 12, and thereby is condensed to become a high-pressure liquid refrigerant in the refrigeration cycle. In the refrigeration cycle, the high-pressure liquid refrigerant that has flowed out from the heat source heat exchanger 12 flows into the expansion mechanism 240. In the refrigeration cycle, a low-pressure refrigerant that has decompressed in the expansion mechanism 240 flows through the liquid refrigerant pipe 254, and flows into the first heat exchanger 230. The refrigerant that has flowed into the first heat exchanger 230 exchanges heat with air sent by the fan 260 and thereby evaporates and becomes a low-pressure gas refrigerant in the refrigeration cycle, and flows out from the first heat exchanger 230. The refrigerant that has flowed out from the first heat exchanger 230 flows through the first gas refrigerant pipe 253 and the suction pipe 251, and is sucked into the compressor 210 again.

Note that the heat transfer medium that has flowed into the heat source heat exchanger 12 from the second flow path 34 by the operation of the pump 50 exchanges heat with the refrigerant and thereby is heated, flows through the first flow path 32, and is sent to the utilization unit 20. In the utilization heat exchanger 22 of the utilization unit 20, the heat transfer medium exchanges heat with the air in the air conditioning target space that is a temperature adjustment target, and heats the air (heats the air conditioning target space). The heat transfer medium that has passed through the utilization heat exchanger 22 and has exchanged heat with the air flows through the second flow path 34, flows into the heat source heat exchanger 12 again.

Note that also in a case where the operating mode of the air conditioning system 1 is the heating mode, the control device C controls the operations of the refrigeration cycle subsystem 200 and the heat transfer subsystem 100 so that the temperature measured by the first temperature sensor 62 and the temperature measured by the second temperature sensor 64 become predetermined temperatures. For example, the control device C appropriately adjusts the capacity of the compressor 210, the opening degree of the electronic expansion valve as the expansion mechanism 240, the number of rotations of the fan 260, the number of rotations of the pump 50, and the like so that the temperature measured by the first temperature sensor 62 and the temperature measured by the second temperature sensor 64 become predetermined temperatures.

(4) Heat Transfer Medium

The heat transfer medium used in the heat transfer subsystem 100 will be described.

The heat transfer subsystem 100 of the present embodiment includes using inorganic hydrate slurry in which an inorganic hydrate that absorbs heat when dissolved in water is mixed with water as the heat transfer medium, instead of water.

The reason for using inorganic hydrate slurry and specific examples of the inorganic hydrate slurry will be described.

(4-1) Reason for Using Inorganic Hydrate Slurry as Heat Transfer Medium

The reason for using inorganic hydrate slurry as the heat transfer medium in the heat transfer method of the present disclosure is to increase a heat transfer amount as compared with a case where water is used for heat transfer, particularly when cold heat is transferred from the heat source unit 10 to the utilization unit 20.

Hereinafter, the reason why such an advantageous effect is obtained by using inorganic hydrate slurry as the heat transfer medium and further using the heat transfer method of the present disclosure will be described.

First, the heat transfer method of the present disclosure will be outlined.

In the heat transfer method of the present disclosure, inorganic hydrate slurry in which an inorganic hydrate that absorbs heat when dissolved in water is mixed with water is used as the heat transfer medium, and cold heat is transferred from the heat source unit 10 to the utilization unit 20 generally under the following conditions.

1) The temperature of the heat transfer medium flowing into the utilization unit 20 is controlled to be equal to or below a melting point of the inorganic hydrate. In other words, the temperature of the heat transfer medium flowing through the first flow path 32 is controlled to be equal to or below the melting point of the inorganic hydrate. Further, preferably, the temperature of the heat transfer medium flowing through the second flow path 34 is also controlled to be equal to or below the melting point of the inorganic hydrate.

2) At least part of the inorganic hydrate is not dissolved in the heat transfer medium flowing into the utilization unit 20. In short, the heat transfer medium flowing into the utilization unit 20 is a saturated solution of the inorganic hydrate, and inorganic hydrate in a solid state not dissolved in water is contained in the heat transfer medium flowing into the utilization unit 20.

3) The amount of inorganic hydrate dissolved per unit mass of water in the heat transfer medium (having a relatively high temperature) flowing out from the utilization unit 20 is different from the amount of inorganic hydrate dissolved per unit mass of water in the heat transfer medium (having a relatively low temperature) flowing into the utilization unit 20. Specifically, the amount of inorganic hydrate dissolved per unit mass of water in the heat transfer medium flowing out from the utilization unit 20 is larger than the amount of inorganic hydrate dissolved per unit mass of water in the heat transfer medium flowing into the utilization unit 20. Preferably, the inorganic hydrate is completely dissolved in water in the heat transfer medium flowing out from the utilization unit 20. In other words, the heat transfer medium flowing out from the utilization unit 20 is an aqueous solution of an unsaturated inorganic hydrate.

In the heat transfer method of the present disclosure, by performing heat transfer under the conditions 1) to 3) described above, when cold heat is transferred from the heat source unit 10 to the utilization unit 20, a large amount of heat can be transferred as compared with heat transfer using water containing no inorganic hydrate as the heat transfer medium even at the same flow rate. The reason is as follows.

When the heat transfer medium flows through the utilization unit 20, cold heat is transferred to the temperature adjustment target and the temperature of the heat transfer medium increases, so that the saturation solubility of the inorganic hydrate increases. As described above, the heat transfer medium flowing into the utilization unit 20 is a saturated solution of the inorganic hydrate, and at least part of the inorganic hydrate is not dissolved. Therefore, the inorganic hydrate not dissolved is dissolved in water as the temperature of the heat transfer medium rises, so that the amount of inorganic hydrate dissolved per unit mass of water increases. In addition, as described above, the inorganic hydrate in the present embodiment is a substance that absorbs heat when dissolved. Accordingly, the present heat transfer medium can transfer a larger amount of cold heat to the temperature adjustment target as compared with a case where water is used for heat transfer under the conditions of the same flow rate and the same temperature difference. In short, in the heat transfer method of the present disclosure, by utilizing latent heat of dissolution (heat absorption), a large amount of cold heat can be transferred to the temperature adjustment target as compared with a case where water is used for heat transfer.

Note that in the heat transfer method of the present disclosure, inorganic hydrate slurry including inorganic hydrate in a solid state flows through the medium circuit 30 at least locally. Therefore, the inorganic hydrate in a solid state may precipitate, or the inorganic hydrate in a solid state may adhere to the inner surfaces of the first pipe 32a, the utilization heat exchanger 22, and the second pipe 34a. In particular, precipitation or adhesion of the inorganic hydrate in a solid state is relatively likely to occur in the first pipe 32a and the utilization heat exchanger 22 (in particular, in the vicinity of the inlet thereof) through which inorganic hydrate slurry having a relatively low temperature flows when cold heat is transferred from the heat source unit 10 to the utilization unit 20.

Therefore, it is preferable that an additive that improves the dispersibility of crystals of the inorganic hydrate be added to the inorganic hydrate slurry.

Further, it is preferable that at least one of the inner surface of the first flow path 32 (the inner surface of the first pipe 32a), the inner surface of the second flow path 34 (the inner surface of the second pipe 34a), and the inner surface of a flow path of the utilization heat exchanger 22 through which the heat transfer medium flows include an area in which hydrophilic faces and hydrophobic faces are alternately arranged. Particularly preferably, the inner surface of the first flow path 32 and the inner surface of the flow path of the utilization heat exchanger 22 through which the heat transfer medium flows include an area in which hydrophilic faces and hydrophobic faces are alternately arranged.

Figure 5:
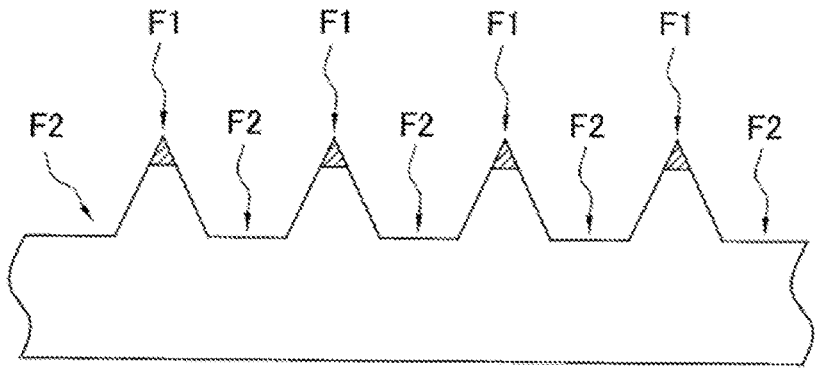
FIG. 5 is a schematic diagram illustrating an example of an arrangement mode of hydrophilic faces and hydrophobic faces provided on an inner surface of a flow path through which the heat transfer medium flows.
Figure 6:
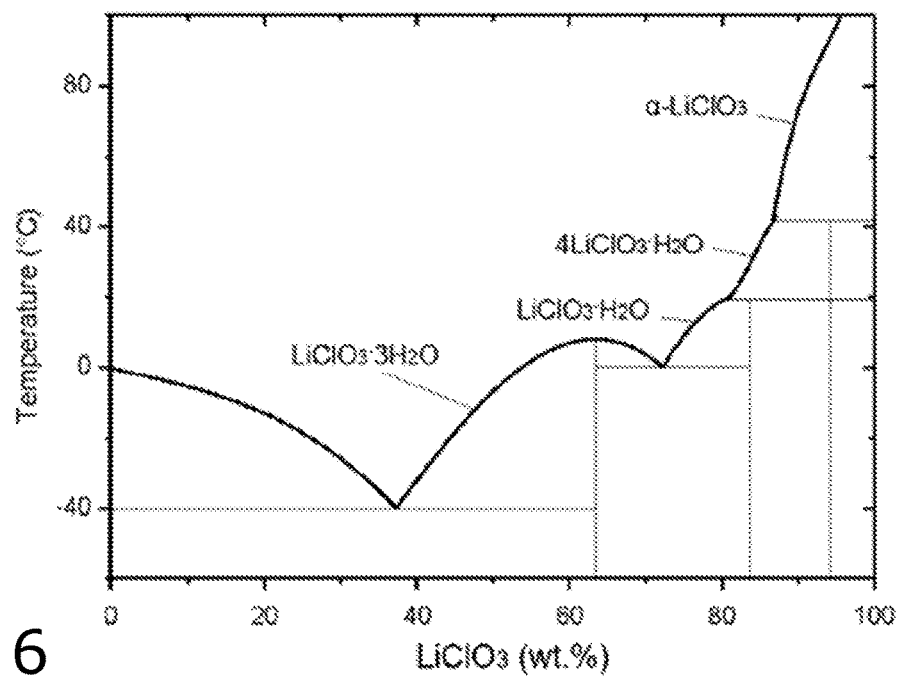
FIG. 6 is a phase diagram of lithium chlorate used for the heat transfer medium in the heat transfer method according to another example.
Figure 7:
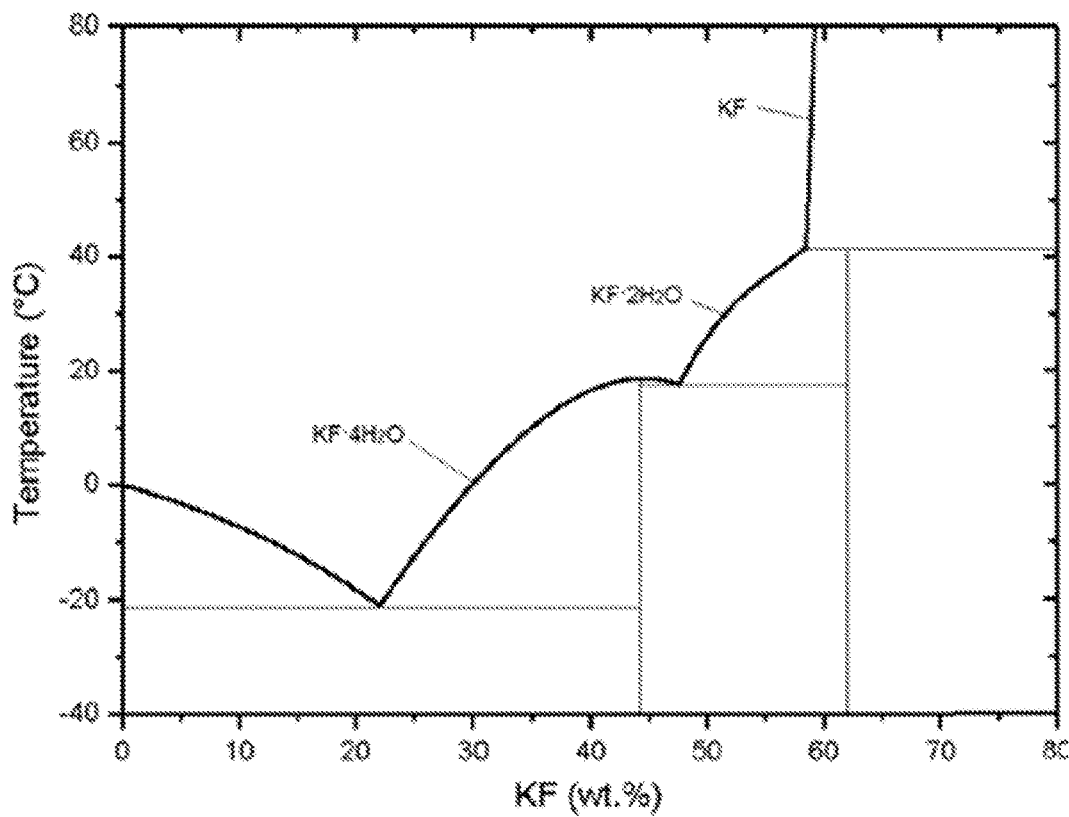
FIG. 7 is a phase diagram of potassium fluoride used for the heat transfer medium in the heat transfer method according to another example.
Figure 8:
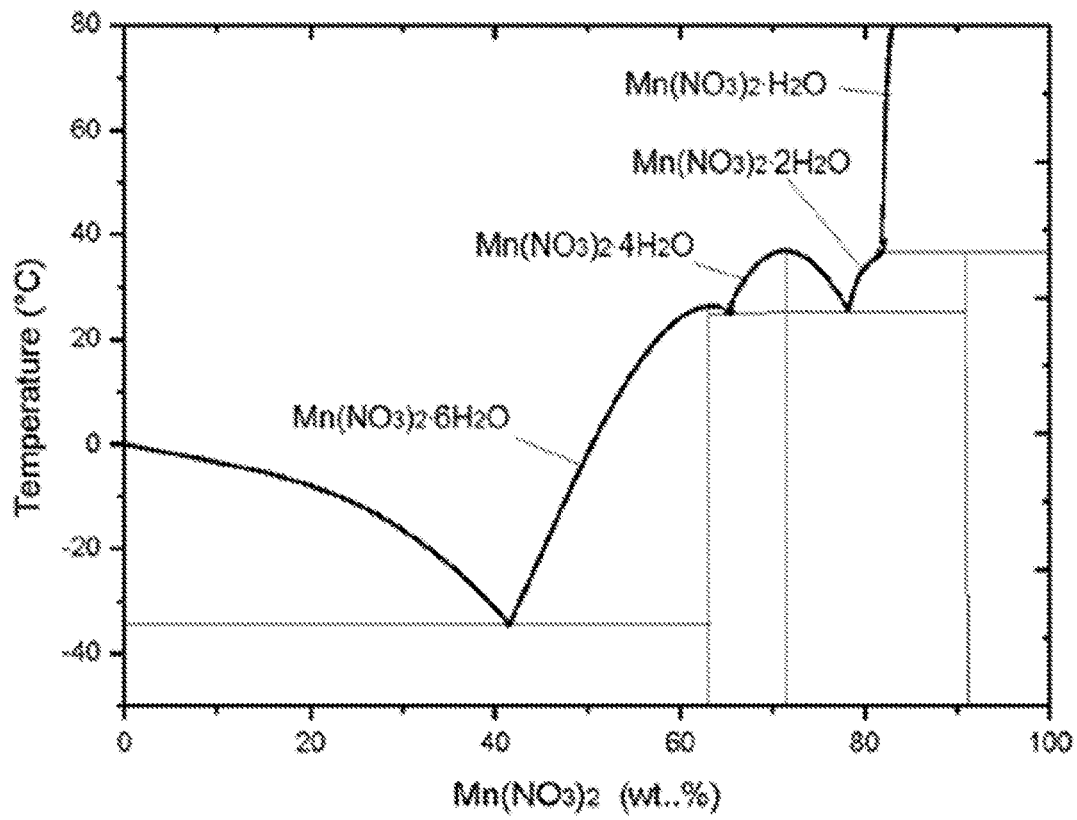
FIG. 8 is a phase diagram of manganese (II) nitrate used for the heat transfer medium in the heat transfer method according to another example.
Figure 9:
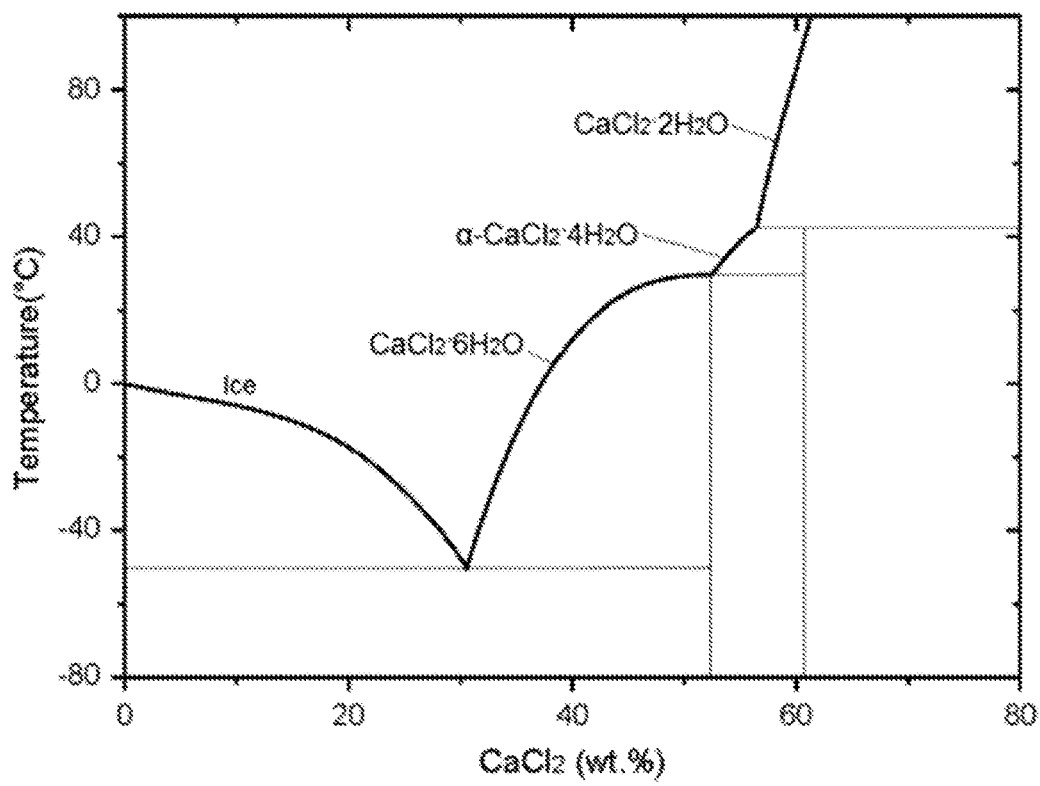
FIG. 9 is a phase diagram of calcium chloride used for the heat transfer medium in the heat transfer method according to another example.
Figure 10:
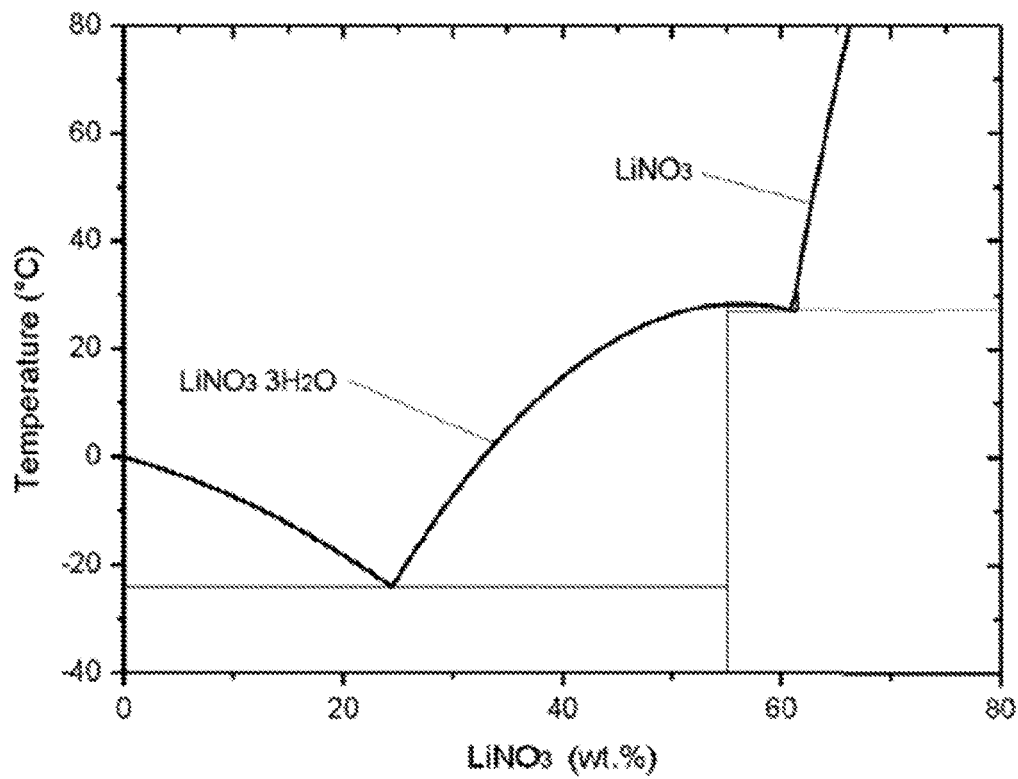
FIG. 10 is a phase diagram of lithium nitrate used for the heat transfer medium in the heat transfer method according to another example.
Figure 11:
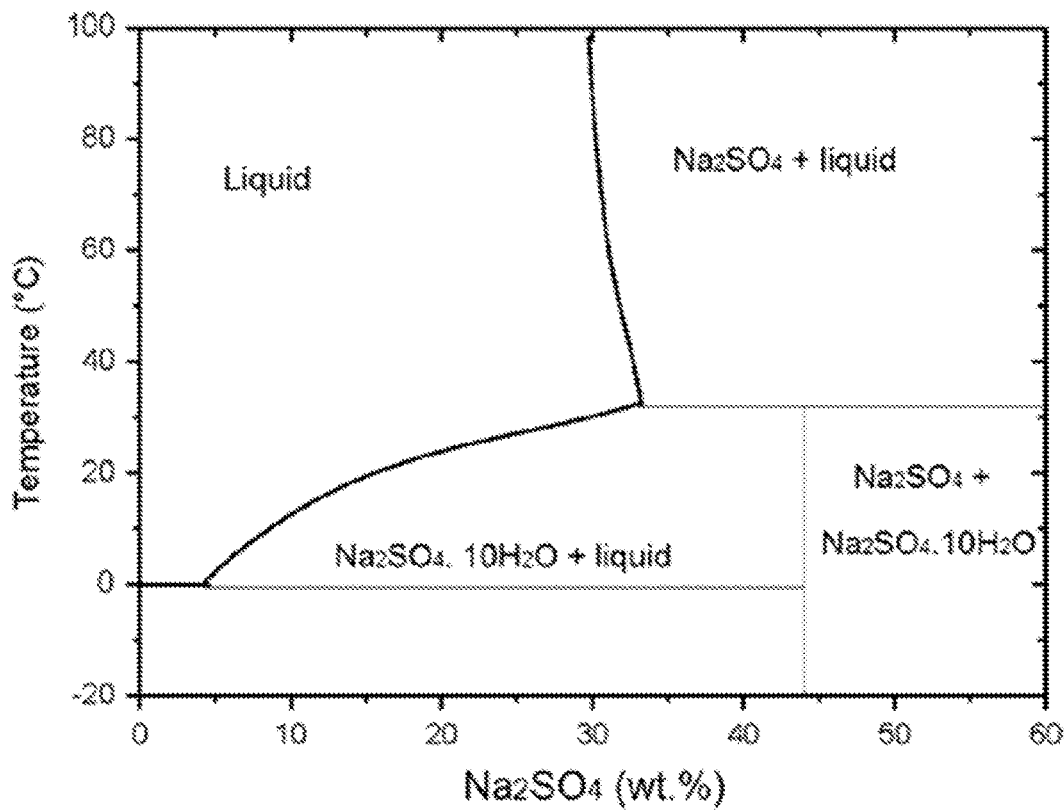
FIG. 11 is a phase diagram of sodium sulfate used for the heat transfer medium in the heat transfer method according to another example.
Figure 12:
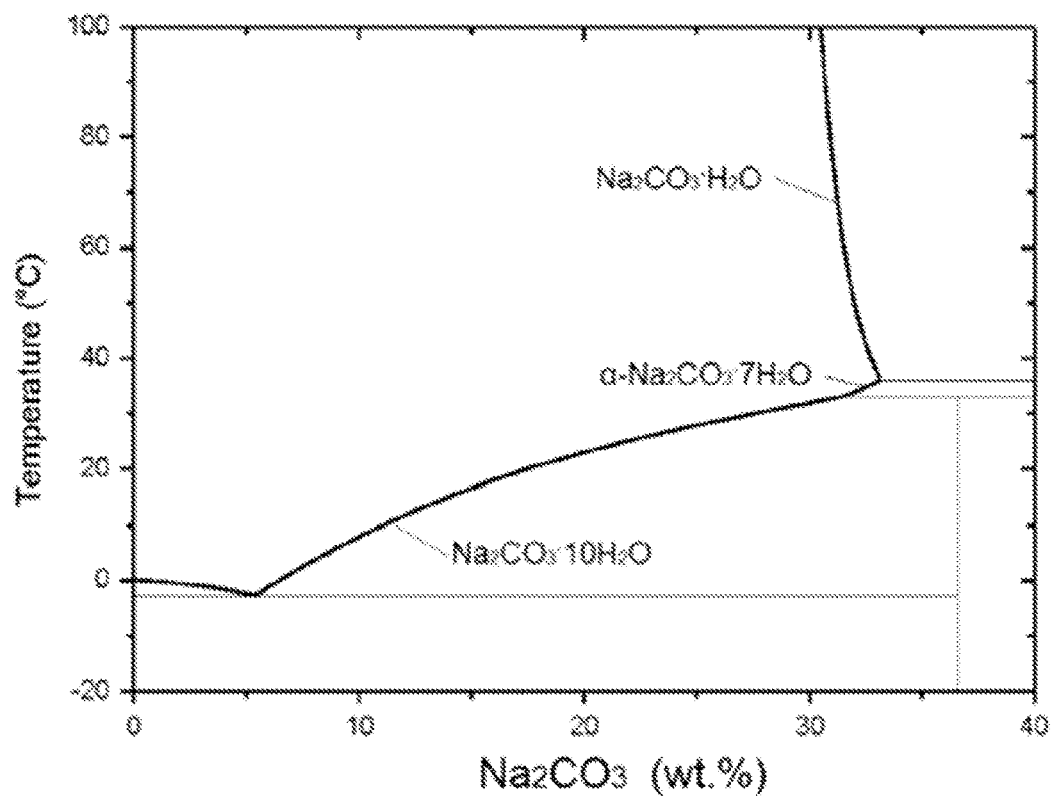
FIG. 12 is a phase diagram of sodium carbonate used for the heat transfer medium in the heat transfer method according to another example.
Figure 13:
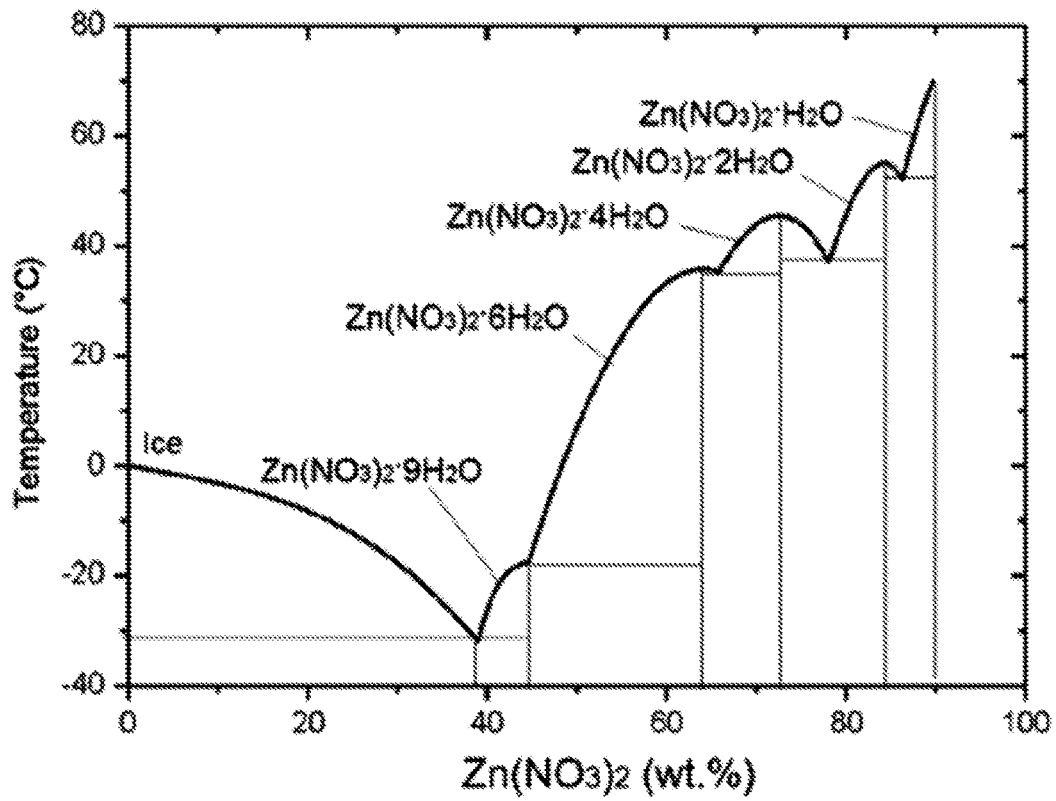
FIG. 13 is a phase diagram of zinc nitrate used for the heat transfer medium in the heat transfer method according to another example.
Figure 14:
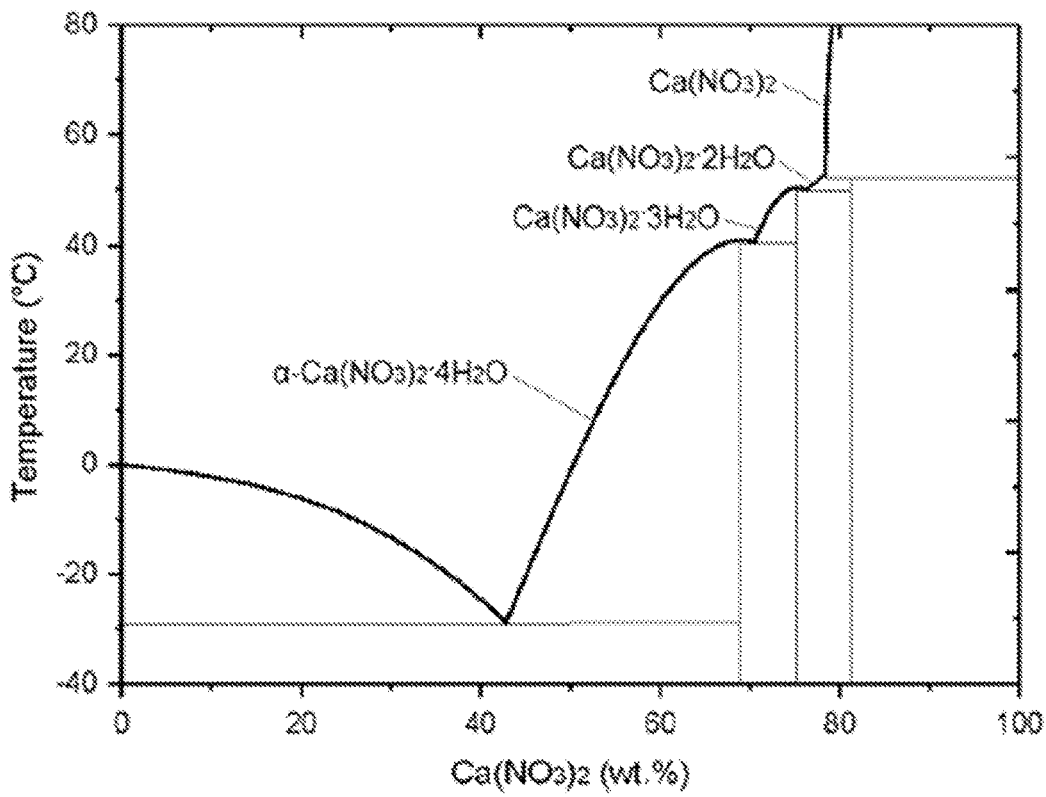
FIG. 14 is a phase diagram of calcium nitrate used for the heat transfer medium in the heat transfer method according to another example.
Figure 15:
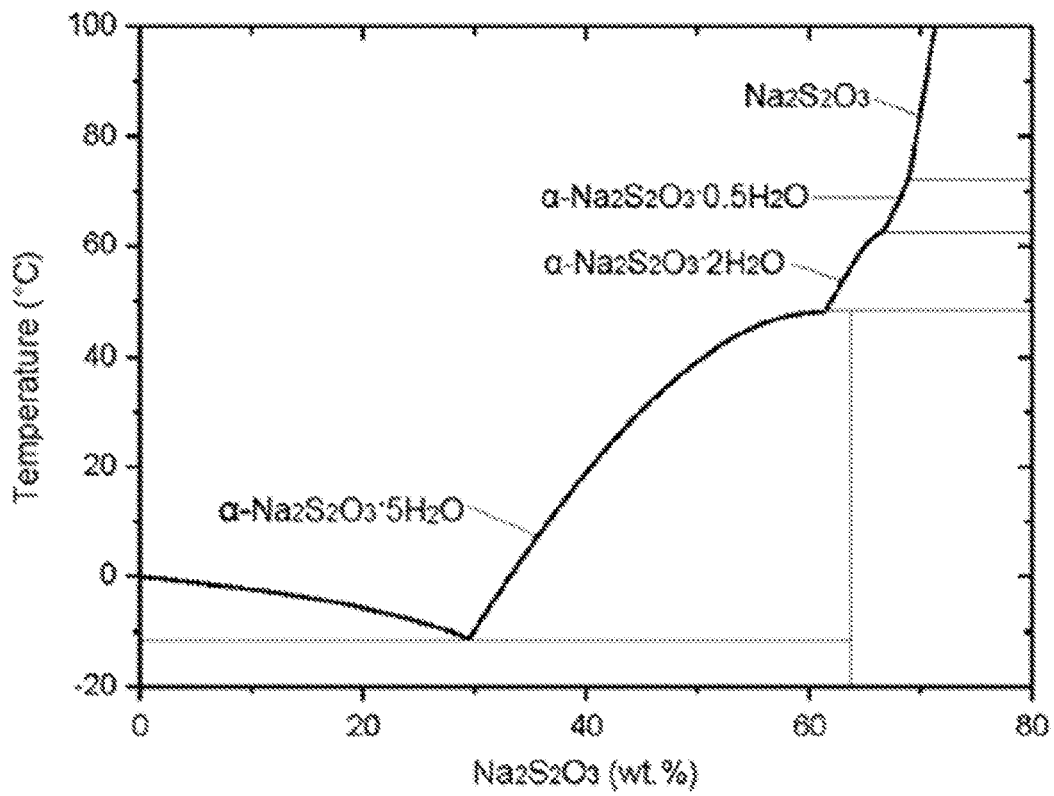
FIG. 15 is a phase diagram of sodium thiosulfate used for the heat transfer medium in the heat transfer method according to another example.
Figure 16:
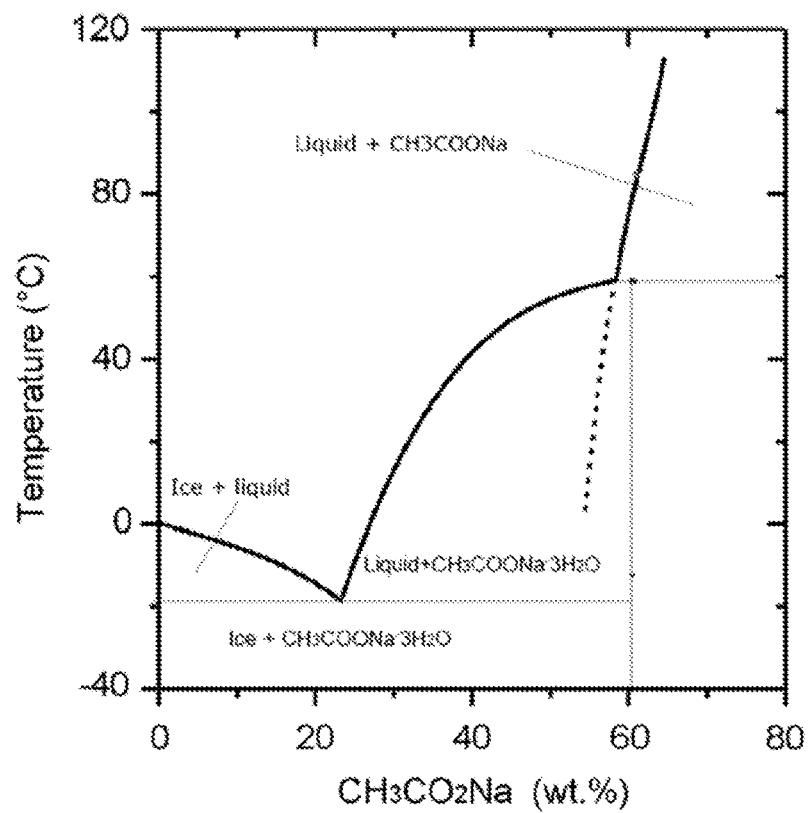
FIG. 16 is a phase diagram of sodium acetate used for the heat transfer medium in the heat transfer method according to another example.
Figure 17:
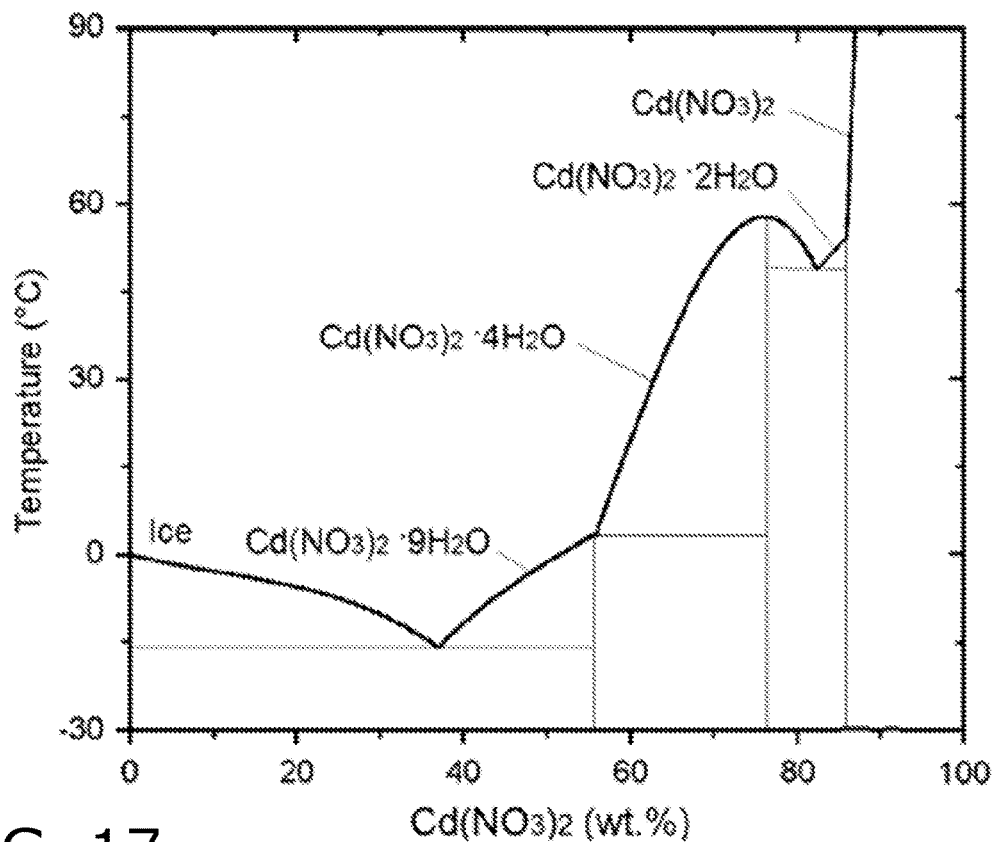
FIG. 17 is a phase diagram of cadmium nitrate used for the heat transfer medium in the heat transfer method according to another example.
Figure 18:
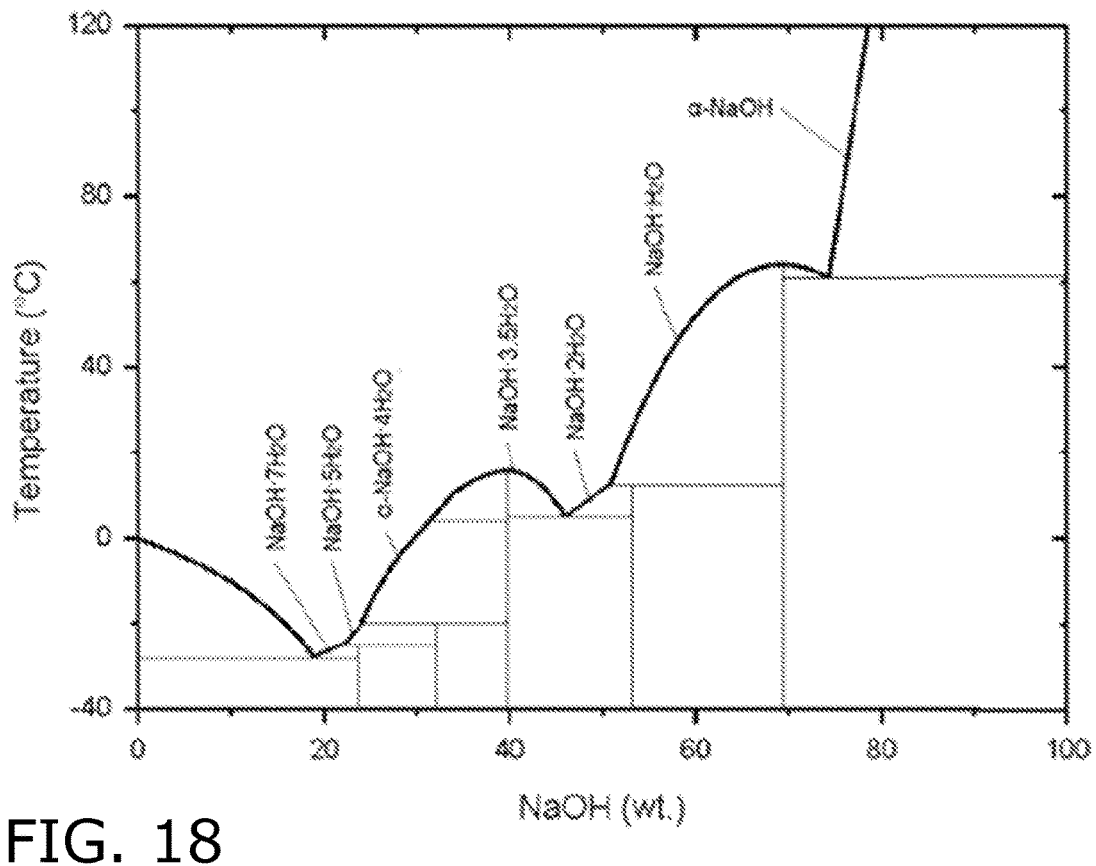
FIG. 18 is a phase diagram of sodium hydroxide used for the heat transfer medium in the heat transfer method according to another example.
Figure 19:
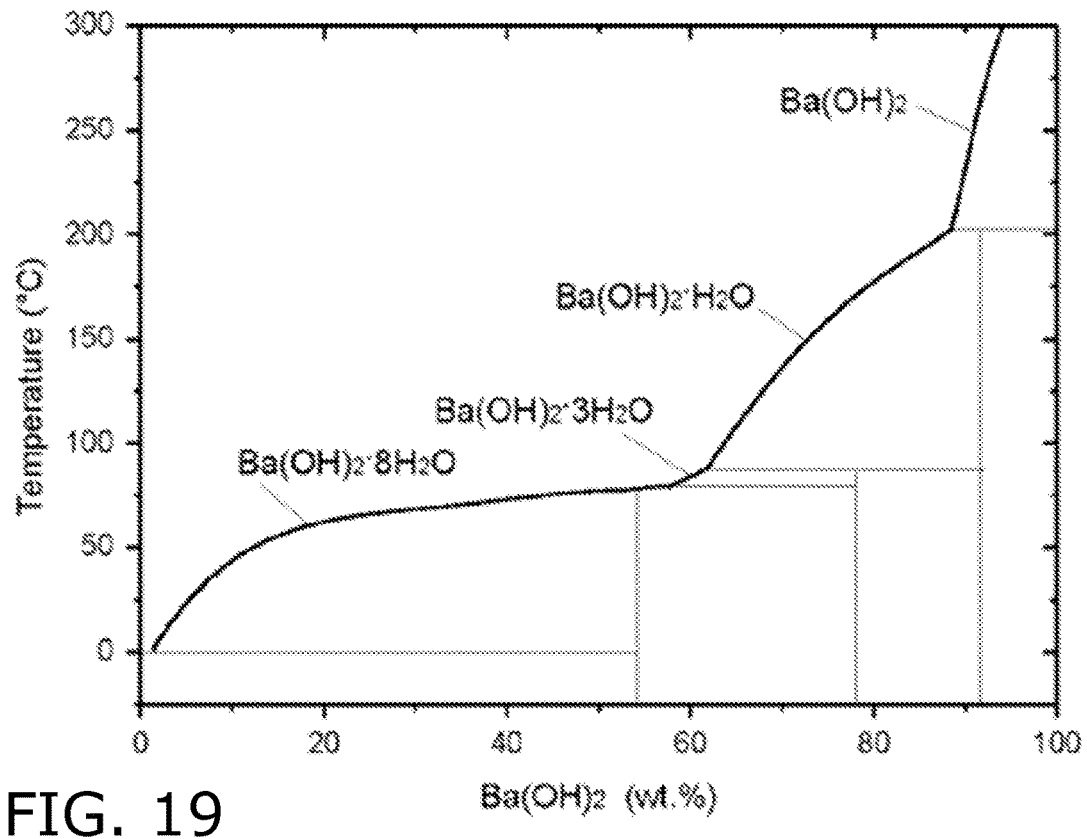
FIG. 19 is a phase diagram of barium hydroxide used for the heat transfer medium in the heat transfer method according to another example.
Figure 20:
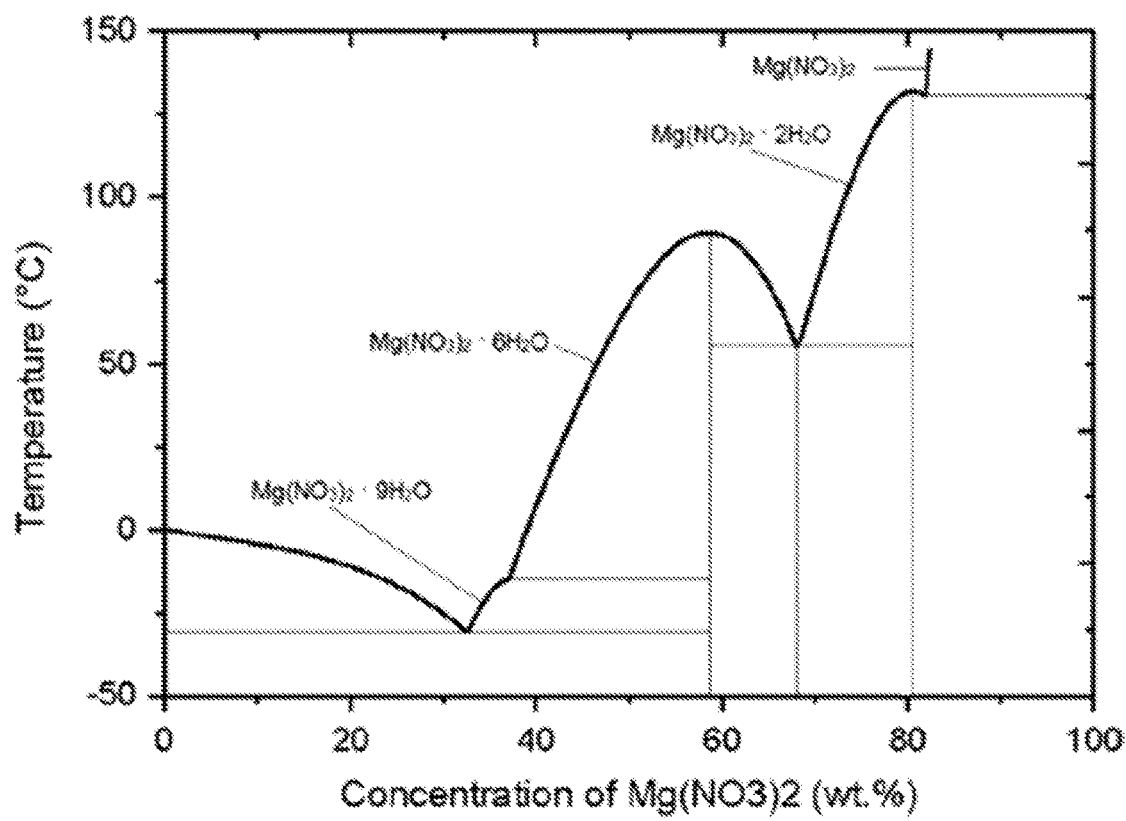
FIG. 20 is a phase diagram of magnesium nitrate used for the heat transfer medium in the heat transfer method according to another example.
Figure 21:
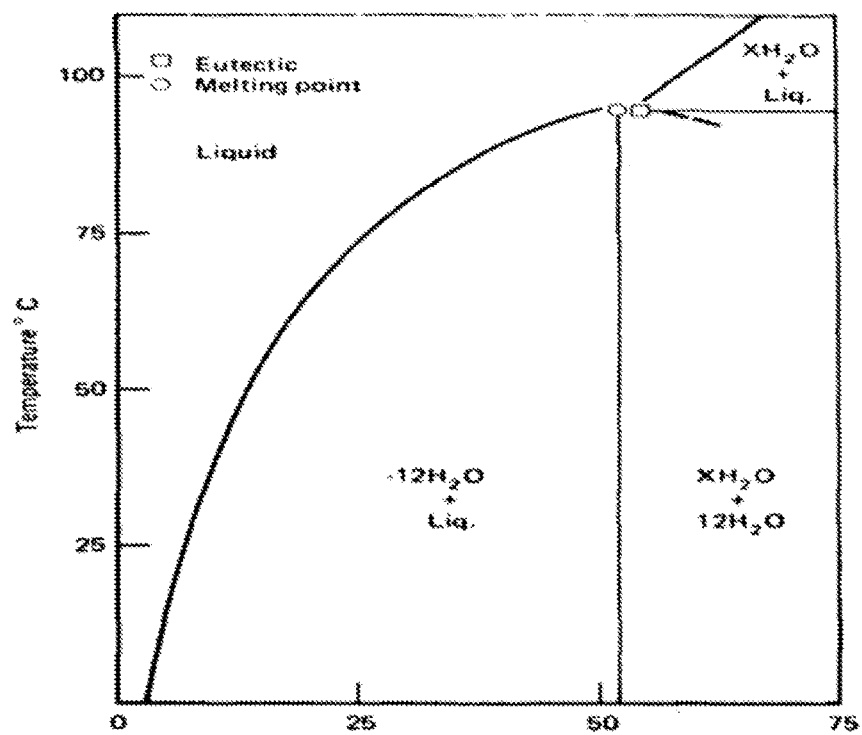
FIG. 21 is a phase diagram of aluminum ammonium sulfate used for the heat transfer medium in the heat transfer method according to another example.
Figure 22:
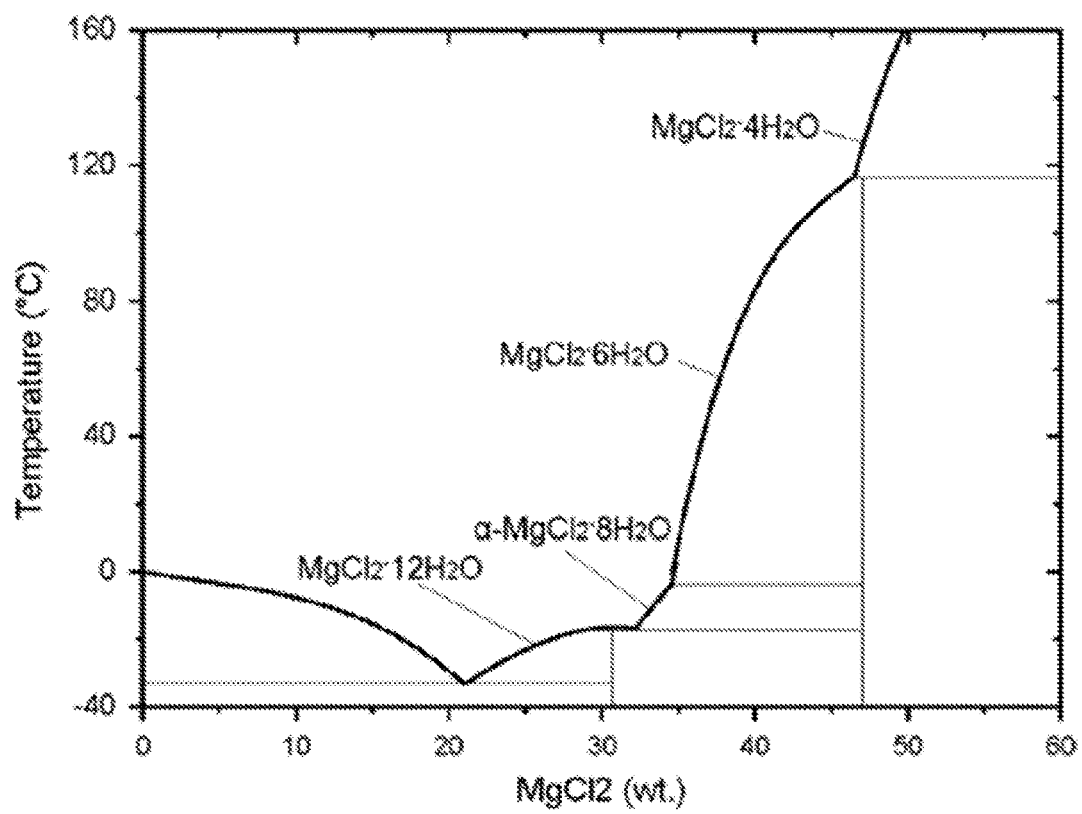
FIG. 22 is a phase diagram of magnesium chloride used for the heat transfer medium in the heat transfer method according to another example.

Such an area in which hydrophilic faces F1 (hatched portions in FIG. 5) and hydrophobic faces F2 (non-hatched portions in FIG. 5) are alternately arranged can be achieved by, for example, providing concavities and convexities on the inner surface of the first flow path 32, the inner surface of the second flow path 34, and/or the inner surface of the utilization heat exchanger 22, and applying hydrophilic treatment only on the tips of the convexities as illustrated in FIG. 5.

Note that the reason why the hydrophilic faces and the hydrophobic faces are alternately provided is that the inorganic hydrate is easily peeled off even if the inorganic hydrate adheres to the inner surfaces of the flow paths for the heat transfer medium. Specifically, by alternately providing the hydrophilic faces and the hydrophobic faces, the adhesion area of the hydrophilic faces to which crystals easily adhere can be reduced, so that the adhesion force of the crystals can be reduced.

(4-2) Specific Examples of Heat Transfer Medium and Specific Examples of Operation Conditions Used in Heat Transfer Method In the present embodiment, phosphoric acid-based inorganic hydrate slurry in which a phosphoric acid-based inorganic hydrate is mixed with water is used as the heat transfer medium. More specifically, the heat transfer medium used in the present embodiment is slurry of disodium hydrogenphosphate in which disodium hydrogenphosphate dodecahydrate as a phosphoric acid-based inorganic hydrate is mixed with water.

The disodium hydrogenphosphate is a substance that is also used as a food additive, and has low toxicity and low risk to the human body. Therefore, there is an advantage that it is not necessary to take measures, against leakage of the slurry of disodium hydrogenphosphate, which are required in a case where a substance that has high toxicity or high risk is used as the heat transfer medium.

Note that when the slurry of disodium hydrogenphosphate is used as the heat transfer medium, it is preferable that an additive that improves the dispersibility of crystals of the phosphoric acid-based inorganic hydrate be added. Specifically, an additive that improves $\zeta$ potential of the surface is added so as to improve the dispersion stability of crystals of the disodium hydrogenphosphate dodecahydrate. For example, sodium dodecyl sulfate that is an anionic surfactant is added to the heat transfer medium as an additive in a mass percent concentration range of from 0.1 wt % to 1 wt % relative to the heat transfer medium. More specifically, in the present embodiment, sodium dodecyl sulfate of 0.5 wt % is added to the slurry of disodium hydrogenphosphate. Note that under these conditions, it has been confirmed that crystals of disodium hydrogenphosphate dodecahydrate are finer and hardly settle out as compared with a case where the sodium dodecyl sulfate is not added.

Note that, as the additive that improves the dispersibility of the crystals of the phosphoric acid-based inorganic hydrate, for example, sodium octyl sulfate, sodium decyl sulfate, sodium hexadecyl sulfate, sodium stearyl sulfate, or sodium octadecyl sulfate may be used instead of sodium dodecyl sulfate. Further, for example, an antifreeze protein may be used as the additive that improves the dispersibility of the crystals of the phosphoric acid-based inorganic hydrate. Further, for example, an alternative substance to the antifreeze protein may be used as the additive that improves the dispersibility of the crystals of the phosphoric acid-based inorganic hydrate. Further, for example, a titanium oxide nanosheet may be used as the additive that improves the dispersibility of the crystals of the phosphoric acid-based inorganic hydrate.

Next, it is sufficient that the weight concentration of the disodium hydrogenphosphate in the slurry of disodium hydrogenphosphate is determined so that when cold heat is transferred from the heat source unit 10 to the utilization unit 20, the heat transfer medium flowing into the utilization unit 20 is in a state where at least part of the disodium hydrogenphosphate dodecahydrate is not dissolved.

Further, it is preferable that the weight concentration of the disodium hydrogenphosphate in the phosphoric acid-based inorganic hydrate slurry be determined so that when cold heat is transferred from the heat source unit 10 to the utilization unit 20, the heat transfer medium flowing out from the utilization unit 20 is in a state where the disodium hydrogenphosphate dodecahydrate is completely dissolved in water.

An appropriate weight concentration of the disodium hydrogenphosphate in the slurry of disodium hydrogenphosphate varies depending on what temperatures the heat transfer medium at an inlet and an outlet of the utilization unit 20 are set to.

The inventors of the present disclosure have found that when the heat transfer subsystem 100 is used in a use of the air conditioning system 1, it is preferable that the temperatures of the heat transfer medium at the inlet and the outlet of the utilization unit 20 be within the following numerical ranges, and the weight concentration of the disodium hydrogenphosphate in the heat transfer medium be within the following numerical range.

a) Temperature (Tin) of heat transfer medium flowing into utilization unit 20: 2° C. to 6° C.

b) Temperature (Tout) of heat transfer medium flowing out from utilization unit 20: 15° C. to 19° C.

c) Weight concentration of disodium hydrogenphosphate in heat transfer medium: 2 wt % to 7 wt %

As specific examples, Tin and Tout are respectively set to 2° C. and 17° C., and the weight concentration of the disodium hydrogenphosphate in the heat transfer medium is set to 5%. It can be read from a phase diagram of the disodium hydrogenphosphate in FIG. 2 that the saturation solubility of the disodium hydrogenphosphate dodecahydrate increases as the temperature rises when the above mentioned temperature ranges are used. In a case where these temperature conditions and concentration condition are used, the heat transfer amount (transfer amount of cold heat) can be increased by 16 J/g as compared with a case where Tin and Tout are set to the same temperature and water is used for heat transfer. This increased heat transfer amount corresponds to about 25% of the heat transfer amount when water is used for heat transfer.

Figure 3:
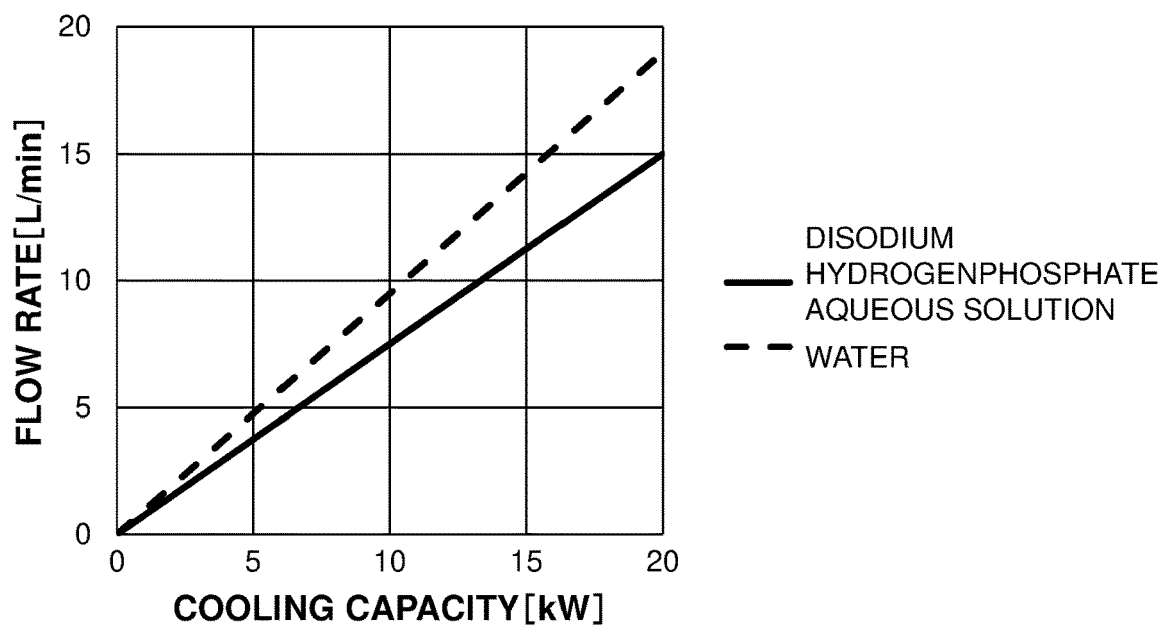
FIG. 3 is a graph illustrating flow rates (L/min) of disodium hydrogenphosphate and water required with respect to a refrigerating capacity (kW) of a utilization unit.
Figure 4:
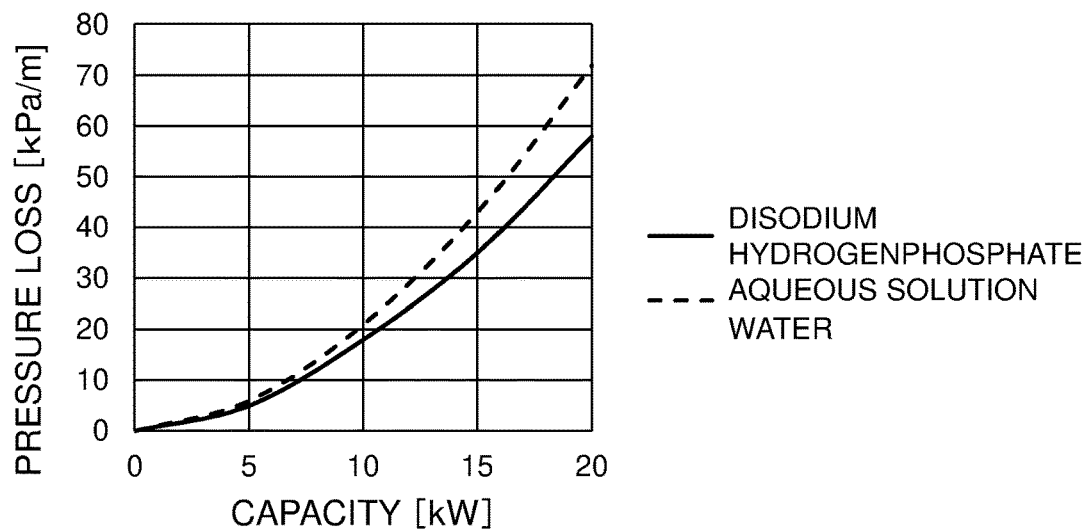
FIG. 4 is a graph illustrating pressure losses (kPa/m) of disodium hydrogenphosphate and water in a case where disodium hydrogenphosphate and water required with respect to the refrigerating capacity (kW) of the utilization unit are made to flow through a straight pipe having an inner diameter of 7.52 mm.

As a result of the increase in heat transfer amount in this manner, as illustrated in FIG. 3, in a case where the same cooling capacity (cold heat transfer capacity) is achieved, the flow rate of the slurry of disodium hydrogenphosphate may be smaller than the flow rate of water. Further, since the same cooling capacity can be achieved with a small flow rate, in a case where the same cooling capacity (cold heat transfer capacity) is achieved by making the slurry of disodium hydrogenphosphate or water flow through the same pipe (a straight pipe having a pipe inner diameter of 7.52 mm) as illustrated in FIG. 4, the pressure loss when the disodium hydrogenphosphate is made to flow through the pipe can be reduced compared to the pressure loss when water is made to flow through the pipe.

Note that the setting of Tin=2° C. and Tout=17° C. has a large temperature difference compared to the setting of the inlet temperature=7° C. and the outlet temperature=12° C., which is commonly used as a cold water temperature of a water chiller. Therefore, as in the present embodiment, the heat transfer amount in a case where the operation conditions used for heat transfer are set such that Tin=2° C., Tout=17° C., and the weight concentration of the disodium hydrogenphosphate in the heat transfer medium=5 wt % can be about 3.5 times the heat transfer amount per the same mass in a case where the operation conditions are set such that the inlet temperature=7° C. and the outlet temperature=12° C. in an ordinary water chiller.

The reason why the temperature difference between Tin and Tout is set in this manner to 15° C., which is large compared to the temperature difference of 5° C. between the inlet temperature and the outlet temperature in a common water chiller, is to perform, by the heat transfer medium, heat transfer equivalent to that by the refrigerant. Advantages of performing heat transfer equivalent to that by the refrigerant will be described.

As means for transferring cold heat to the air conditioning target space, in addition to a mode in which heat supplied by the refrigeration cycle subsystem 200 is transferred to a location (utilization unit 20) where heat is utilized by a heat transfer medium that is a secondary medium as in the heat transfer method of the present disclosure, it is also conceivable to directly transfer a refrigerant of the refrigeration cycle to the location where heat is utilized. A refrigerant used in the refrigeration cycle subsystem 200 of the present embodiment, such as a hydrofluorocarbon-based refrigerant or the like, can utilize latent heat of evaporation, so that the heat transfer amount per unit mass is relatively large. Therefore, it is preferable that the refrigerant be directly used for heat transfer from a viewpoint of reducing the pipe size and reducing the pipe laying cost. However, from a viewpoint of environmental protection, there is a demand for reducing production and the use of a refrigerant having relatively large global warming potential, such as a hydrofluorocarbon-based refrigerant. Therefore, the air conditioning system is required to reduce the pipe size and reduce the pipe laying cost while reducing the use amount of the refrigerant having large global warming potential.

In view of the above, in the heat transfer method of the present disclosure, in order to make the heat transfer amount per mass equivalent to that of the refrigerant, inorganic hydrate slurry (in particular, slurry of disodium hydrogenphosphate) is used as the heat transfer medium to utilize latent heat of dissolution for heat transfer, and in addition, the temperature difference between Tin and Tout is set to be larger than the temperature difference between the inlet temperature and the outlet temperature of an ordinary water chiller.

Note that the conditions a) to c) are described above as preferable conditions of Tin, Tout, and the weight concentration of the disodium hydrogenphosphate in the heat transfer medium, which are used in the heat transfer method. However, the conditions used in the heat transfer method of the present disclosure are not limited to the above conditions. For example, in a case where the weight concentration of the disodium hydrogenphosphate is set to 7%, Tin may be selected from the range of from 2° C. to 6° C., and Tout may be set to 20° C. or more.

(5) How to Select Pipe Diameters of Heat Transfer Subsystem

How to select pipe diameters of the heat transfer subsystem 100 will be described.

In a water chiller in the art, the diameter of a pipe for cold water is set in accordance with an assumed amount of circulating water, and pipes having the same pipe diameter are used for a supply pipe through which water flows toward a utilization unit and a return pipe through which water flows from the utilization unit.

On the other hand, in the heat transfer subsystem 100 utilized in the heat transfer method of the present disclosure, it is preferable that the diameter of the first pipe 32a be larger than the diameter of the second pipe 34a.

The reason is that, as described above, in the heat transfer subsystem 100, when cold heat is transferred from the heat source unit 10 to the utilization unit 20, at least the heat transfer medium flowing through the first flow path 32 contains disodium hydrogenphosphate dodecahydrate in a solid state. In short, in the heat transfer subsystem 100, when cold heat is transferred from the heat source unit 10 to the utilization unit 20, a solid-liquid two-phase flow flows through the first flow path 32. Therefore, in the heat transfer subsystem 100 in which the heat transfer method of the present disclosure is used, the pressure loss in the first flow path 32 tends to increase. On the other hand, as described above, the heat transfer medium in a state where disodium hydrogenphosphate dodecahydrate is preferably completely dissolved in water flows through the second flow path 34. It has been experimentally confirmed that the pressure loss when a heat transfer medium in a state where disodium hydrogenphosphate dodecahydrate is dissolved in water is made to flow through a pipe is substantially equivalent to the pressure loss when water is made to flow through the same pipe. Therefore, in the heat transfer subsystem 100 utilized in the heat transfer method of the present disclosure, it is preferable to use the first pipe 32a having a diameter larger than the diameter of the second pipe 34a.

Specifically, in the heat transfer subsystem 100, dimensions as in Table 1 are selected for the outer diameter of the first pipe 32a and the outer diameter of the second pipe 34a in accordance with the rated air-cooling capacity in the utilization unit 20 (the rated cooling capacity in the utilization heat exchanger 22).

Note that the wall thickness of the pipe is 0.8 mm in a case where the outer diameter of the pipe is 6.4 mm, 9.5 mm, or 12.7 mm, the wall thickness of the pipe is 1.0 mm in a case where the outer diameter of the pipe is 15.9 mm, 19.1 mm, 22.2 mm, 25.4 mm, or 28.6 mm, the wall thickness of the pipe is 1.1 mm in a case where the outer diameter of the pipe is 31.8 mm, and the wall thickness of the pipe is 1.35 mm in a case where the outer diameter of the pipe is 38.1 mm.

TABLE 1

Relationship between air-cooling capacity (cooling capacity) and outer diameters of first pipe and second pipe

| Air-cooling capacity [kW] | Outer diameter of first pipe [mm] | Outer diameter of second pipe [mm] |
|---|---|---|
| 2.2 | 12.7 | 6.4 |
| 2.8 | 12.7 | 6.4 |
| 3.6 | 12.7 | 6.4 |
| 4.5 | 12.7 | 6.4 |
| 5.6 | 12.7 | 6.4 |
| 7.1 | 15.9 | 9.5 |
| 8 | 15.9 | 9.5 |
| 9 | 15.9 | 9.5 |
| 11.2 | 15.9 | 9.5 |
| 14 | 15.9 | 9.5 |
| 16 | 19.1 | 9.5 |
| 22.4 | 19.1 | 9.5 |
| 28 | 22.2 | 9.5 |
| 33.5 | 25.4 | 12.7 |
| 40 | 25.4 | 12.7 |
| 45 | 28.6 | 12.7 |
| 50 | 28.6 | 15.9 |
| 56 | 28.6 | 15.9 |
| 61.5 | 28.6 | 15.9 |
| 69 | 28.6 | 15.9 |
| 73 | 31.8 | 19.1 |
| 80 | 31.8 | 19.1 |
| 85 | 31.8 | 19.1 |
| 90 | 31.8 | 19.1 |
| 95 | 31.8 | 19.1 |
| 100 | 31.8 | 19.1 |
| 109 | 38.1 | 19.1 |
| 112 | 38.1 | 19.1 |
| 118 | 38.1 | 19.1 |
| 125 | 38.1 | 19.1 |
| 132 | 38.1 | 19.1 |
| 136 | 38.1 | 19.1 |
| 140 | 38.1 | 19.1 |
| 145 | 38.1 | 19.1 |
| 150 | 38.1 | 19.1 |

Note
that as described above, for example, by setting Tin to 2° C. and Tout to 17° C., setting the weight concentration of the disodium hydrogenphosphate in the heat transfer medium to 5 wt %, making the heat transfer amount per unit mass of the heat transfer medium equivalent to that of the refrigerant, and making the outer diameter of the first pipe 32a larger than the outer diameter of the second pipe 34a, the following advantages can also be obtained.

In the art, air conditioning systems are widely used in which a utilization unit (utilization unit of a refrigeration cycle device) is installed in an air conditioning target space and a refrigeration cycle system uses a refrigerant (without using a secondary medium, such as water) to directly transfer heat to the utilization unit. However, from a viewpoint of environmental protection, there is a demand for reducing the use of a refrigerant having high global warming potential. Accordingly, when replacing an air conditioning system, it may be necessary to employ an air conditioning system that uses a secondary medium to transfer heat to a utilization unit without using a refrigerant instead of an air conditioning system that uses a refrigerant to directly transfer heat to a utilization unit. In this case, in a case where a water chiller in the art is used under use conditions in the art (for example, the inlet temperature of 5° C. and the outlet temperature of 12° C.), it is difficult to use connection pipes in the air conditioning system that uses a refrigerant to directly transfer heat to the utilization unit as pipes for transferring water as a secondary medium due to a difference in heat transfer amount per unit mass. Therefore, when replacing an air conditioning system that uses a refrigerant to directly transfer heat to a utilization unit to a chiller system that uses water as a secondary medium, work to lay a pipe having a relatively large diameter is required.

On the other hand, in the heat transfer method of the present disclosure, the heat transfer amount per unit mass of the heat transfer medium is equivalent to that of the refrigerant. Accordingly, refrigerant connection pipes in an air conditioning system that uses a refrigerant to directly transfer heat to a utilization unit can be used as the first pipe 32a and the second pipe 34a in the heat transfer subsystem 100. Further, in the air conditioning system that uses a refrigerant to directly transfer heat to the utilization unit, the pipe diameter of a gas refrigerant connection pipe is larger than the pipe diameter of a liquid refrigerant connection pipe. Accordingly, if the gas refrigerant connection pipe is used as the first pipe 32a, and the liquid refrigerant connection pipe is used as the second pipe 34a, it is also possible to deal with the problem of the pressure loss associated with the solid-liquid two-phase flow.

(6) Feature (6-1)

The heat transfer method of the present embodiment is a heat transfer method using the heat transfer subsystem 100 as an example of a heat transfer method. The heat transfer subsystem 100 includes the heat source unit 10, the utilization unit 20, the first flow path 32, and the second flow path 34. In the heat source unit 10, heat is exchanged between a heat transfer medium and a heat source. In the utilization unit 20, heat is exchanged between the heat transfer medium and a temperature adjustment target. In the present embodiment, the temperature adjustment target is air in an air conditioning target space. The first flow path 32 connects the heat source unit 10 and the utilization unit 20. The heat transfer medium flows through the first flow path 32 from the heat source unit 10 to the utilization unit 20. The second flow path 34 connects the heat source unit 10 and the utilization unit 20. The heat transfer medium flows through the second flow path 34 from the utilization unit 20 to the heat source unit 10. The heat transfer method includes using, as the heat transfer medium, inorganic hydrate slurry in which an inorganic hydrate that absorbs heat when dissolved in water is mixed with water. The heat transfer method includes controlling the heat transfer subsystem 100 so that the temperature of the heat transfer medium flowing through the first flow path 32 becomes a temperature equal to or below the melting point of the inorganic hydrate. Further, the heat transfer method includes controlling the heat transfer subsystem 100 so that a temperature of the heat transfer medium flowing through the second flow path 34 becomes a temperature equal to or below the melting point of the inorganic hydrate. Further, the heat transfer method includes making an amount of inorganic hydrate dissolved per unit mass of water in the heat transfer medium flowing through the first flow path 32 different from an amount of inorganic hydrate dissolved per unit mass of water in the heat transfer medium flowing through the second flow path 34.

Water has a small heat transfer amount per unit mass as compared with a refrigerant, such as an alternative chlorofluorocarbon. Accordingly, in the conventional chiller, there is a problem that a pipe for transferring a medium is increased in size and a facility introduction cost tends to increase as compared with a case where an alternative chlorofluorocarbon or the like is used.

According to the heat transfer method of the present embodiment, not only sensible heat but also heat of dissolution (latent heat of dissolution) can be utilized for heat transfer, and heat can be efficiently transferred as compared with a case where plain water is used as the heat transfer medium. Therefore, according to the heat transfer method, it is possible to suppress an increase in size of the pipes and to reduce the introduction cost of the heat transfer subsystem 100 as compared with a case where water is used as the heat transfer medium.

(6-2)

The heat transfer method of the present embodiment includes transferring cold heat from the heat source unit 10 to the utilization unit 20. According to the heat transfer method of the present embodiment, the temperature adjustment target can be efficiently cooled.

(6-3)

The heat transfer method of the present embodiment includes using, as the heat transfer medium, phosphoric acid-based inorganic hydrate slurry in which a phosphoric acid-based inorganic hydrate is mixed with water.

In particular, in the heat transfer method of the present embodiment, the phosphoric acid-based inorganic hydrate is disodium hydrogenphosphate dodecahydrate. A weight concentration of disodium hydrogenphosphate in the phosphoric acid-based inorganic hydrate slurry is in a range of from 2% to 7%. The heat transfer method includes controlling the heat transfer system so that a temperature of the heat transfer medium flowing into the utilization unit from the first flow path is in a range of from 2° C. to 6° C., and a temperature of the heat transfer medium flowing out from the utilization unit to the second flow path is in a range of from 15° C. to 19° C.

According to the heat transfer method of the present embodiment, since a large temperature difference is ensured between the inlet and the outlet of the utilization unit as compared with an ordinary water chiller, it is possible to reduce the flow rate of the heat transfer medium necessary for transferring cold heat. Therefore, according to the heat transfer method, it is possible to suppress an increase in size of the pipes and to reduce the introduction cost of the heat transfer system as compared with a case where plain water is used as the heat transfer medium.

Further, since the disodium hydrogenphosphate that is utilized as the heat transfer medium is also used as a food additive, it is highly safe.

(6-4)

In the heat transfer method of the present embodiment, the diameter of the first pipe 32a forming the first flow path 32 is larger than the diameter of the second pipe 34a forming the second flow path 34.

In the heat transfer method of the present embodiment, the diameter of the first pipe 32a is made larger than the diameter of the second pipe 34a. When cold heat is transferred to the utilization unit, the inorganic hydrate slurry having a low temperature and containing a large amount of inorganic hydrate not dissolved flows through the first pipe 32a, and the inorganic hydrate slurry having a high temperature and containing a small amount of inorganic hydrate not dissolved or in which the inorganic hydrate is completely dissolved flows through the second pipe 34a. Therefore, according to the heat transfer method of the present embodiment, it is possible to suppress an increase in pressure loss in the first flow path 32 for the heat transfer medium.

Note that, for the following reasons, by utilizing the heat transfer method of the present embodiment, it is possible to reduce the cost of replacing a refrigeration cycle device that uses a refrigerant to transfer heat to the utilization unit (without using a heat transfer medium as a secondary medium) with a system including the heat transfer subsystem 100 that utilizes the heat transfer method of the present disclosure.

In the refrigeration cycle device, heat source equipment and utilization equipment are connected by connection pipes.

When trying to replace such a refrigeration cycle device with a system that utilizes a heat transfer system (a water chiller in the art) that uses water as a heat transfer medium, it is difficult to utilize the connection pipes as it is because the heat transfer amount per unit mass of water is small compared to that of a refrigerant.

On the other hand, according to the heat transfer method of the present disclosure, as described above, heat can be efficiently transferred as compared with a case where water is used as the heat transfer medium (in particular, heat can be transferred with efficiency equivalent to that in a case of the refrigerant). Therefore, the connection pipes of the refrigeration cycle device can be utilized as it is as the pipes of the heat transfer system. Further, the connection pipes of the refrigeration cycle device include a gas refrigerant connection pipe having a large diameter and a liquid refrigerant connection pipe having a small diameter. Therefore, if the gas refrigerant connection pipe having a large diameter is utilized as the first flow path 32, and the liquid refrigerant connection pipe having a small diameter is utilized as the second flow path 34, it is possible to suppress an increase in pressure loss associated with transfer of the heat transfer medium (in particular, associated with transfer of the solid-liquid two-phase heat transfer medium) while utilizing the connection pipes of the refrigeration cycle device.

(6-5)

In the heat transfer method of the present embodiment, the rated cooling capacity of the utilization unit, the outer diameter of the first pipe 32a forming the first flow path 32, and the outer diameter of the second pipe 34a forming the second flow path 34 satisfy the relationship illustrated in Table 1.

According to the heat transfer method of the present embodiment, by satisfying the relationship in Table 1 between the cooling capacity and the outer diameters of the first pipe 32a and the second pipe 34a, it is possible to suppress an increase in pressure loss in the first flow path 32 and the second flow path 34 while suppressing an increase in diameter of the pipes and reducing the introduction cost of the heat transfer subsystem 100 associated with the increase in diameter of the pipes.

(6-6)

The heat transfer method of the present embodiment includes adding an additive that improves dispersibility of crystals of the phosphoric acid-based inorganic hydrate to the heat transfer medium.

By adding such an additive, it is possible to suppress the deposition on the flow paths or the like of the phosphoric acid-based inorganic hydrate not dissolved in water.

Preferably, the additive is sodium dodecyl sulfate that is a surfactant, and a mass percent concentration of which is in a range of from 0.1 wt % to 1 wt % relative to the heat transfer medium.

Further, the additive may be sodium octyl sulfate, sodium decyl sulfate, sodium hexadecyl sulfate, sodium stearyl sulfate, or sodium octadecyl sulfate, for example.

Further, the additive may be an antifreeze protein, for example.

Further, the additive may be an alternative substance to the antifreeze protein, for example.

Further, the additive may be a titanium oxide nanosheet, for example.

(6-7)

In the heat transfer method of the present embodiment, the utilization unit 20 includes the utilization heat exchanger 22 in which heat is exchanged between the heat transfer medium and the temperature adjustment target. At least one of the inner surface of the first pipe 32a of the first flow path 32, the inner surface of the second pipe 34a of the second flow path 34, and the inner surface of a flow path of the utilization heat exchanger 22 through which the heat transfer medium flows includes an area in which the hydrophilic faces F1 and the hydrophobic faces F2 are alternately arranged.

Preferably, the inner surface of the first pipe 32a of the first flow path 32 and the inner surface of the flow path of the utilization heat exchanger 22 through which the heat transfer medium flows include an area in which the hydrophilic faces F1 and the hydrophobic faces F2 are alternately arranged.

According to the heat transfer method of the present embodiment, it is possible to suppress the adhesion to and the deposition on the inner surfaces of the flow paths for the heat transfer medium, of the inorganic hydrate in a solid state in the heat transfer medium.

(7) Modifications

Hereinafter, modifications of the above embodiment will be described. Note that the contents of the following modifications may be combined with some or all of the contents of other modifications as long as they do not contradict each other.

(7-1) Modification A

In the above embodiment, a case has been described where disodium hydrogenphosphate dodecahydrate is used as an example of the inorganic hydrate that absorbs heat when dissolved in water. However, the inorganic hydrate used in the heat transfer method of the present disclosure is not limited to the disodium hydrogenphosphate dodecahydrate.

For example, the inorganic hydrate that absorbs heat when dissolved in water used in the heat transfer method of the present disclosure includes lithium chlorate trihydrate, potassium fluoride tetrahydrate, manganese (II) nitrate hexahydrate, calcium chloride hexahydrate, lithium nitrate trihydrate, sodium sulfate decahydrate, sodium carbonate decahydrate, zinc nitrate hexahydrate, calcium nitrate tetrahydrate, sodium thiosulfate pentahydrate, sodium acetate trihydrate, cadmium nitrate tetrahydrate, sodium hydroxide monohydrate, barium hydroxide octahydrate, magnesium nitrate hexahydrate, aluminum ammonium sulfate dodecahydrate, and magnesium chloride hexahydrate, but not limited thereto.

Note that, in a case where the temperature (Tin) of the heat transfer medium flowing into the utilization unit 20 from the first flow path 32 is set to 2° C. to 6° C., and the temperature (Tout) of the heat transfer medium flowing into the second flow path 34 from the utilization unit 20 is set to 15° C. to 19° C., as illustrated in phase diagrams of the substances in FIGS. 6 to 22, these inorganic hydrates are substances in each of which the temperature of the heat transfer medium flowing through the first flow path 32 and the second flow path 34 is equal to or below the melting point of the inorganic hydrate, and the saturation solubility of the inorganic hydrate varies in the temperature range between Tin and Tout.

Note that it is sufficient that the concentration of the inorganic hydrate is appropriately determined so as to satisfy the following conditions when cold heat is transferred from the heat source unit 10 to the utilization unit 20.

The heat transfer medium (having the temperature Tin) flowing into the utilization unit 20 is a saturated solution of the inorganic hydrate, and inorganic hydrate in a solid state not dissolved in water is contained in the heat transfer medium flowing into the utilization unit 20.

The amount of inorganic hydrate dissolved per unit mass of water in the heat transfer medium (having the temperature Tout, which is a relatively high temperature) flowing out from the utilization unit 20 is different from the amount of inorganic hydrate dissolved per unit mass of water in the heat transfer medium (having the temperature Tin, which is a relatively low temperature) flowing into the utilization unit 20. Specifically, the amount of inorganic hydrate dissolved per unit mass of water in the heat transfer medium flowing out from the utilization unit 20 is larger than the amount of inorganic hydrate dissolved per unit mass of water in the heat transfer medium flowing into the utilization unit 20. Preferably, the inorganic hydrate is completely dissolved in water in the heat transfer medium flowing out from the utilization unit 20. In other words, the heat transfer medium flowing out from the utilization unit 20 is an aqueous solution of an unsaturated inorganic hydrate.

Note that it is sufficient that the inorganic hydrate to be used is appropriately determined on the basis of the safety, the heat absorption amount at the time of dissolving, the temperatures Tin and Tout of the heat transfer medium, and the like.

(7-2) Modification B

In the above embodiment, it is not assumed that latent heat of dissolution is utilized when the heat transfer subsystem 100 transfers hot heat from the heat source unit 10 to the utilization unit 20 (when the operating mode of the air conditioning system 1 is heating mode). However, the present invention is not limited thereto.

Depending on the temperature range in which the heat transfer medium is used (values of Tin and Tout) and the type of the inorganic hydrate used, latent heat of dissolution can be utilized also when hot heat is transferred from the heat source unit 10 to the utilization unit 20.

SUPPLEMENTARY

While the embodiment of the present disclosure has been described heretofore, it will be understood that various changes in mode and detail can be made without departing from the gist and scope of the present disclosure described in the claims.

INDUSTRIAL APPLICABILITY

The heat transfer method of the present disclosure can be widely applicable to and useful for heat transfer using the heat transfer system.

REFERENCE SIGNS LIST

10 Heat source unit
20 Utilization unit
32 First flow path
32a First pipe (pipe forming first flow path)
34 Second flow path
34a Second pipe (pipe forming second flow path)
100 Heat transfer subsystem (heat transfer system)
F1 Hydrophilic face
F2 Hydrophobic face

CITATION LIST

Patent Literature

[Patent Document 1] International Publication No. 2011/099629

The invention claimed is:

1. A heat transfer method using a heat transfer system, the heat transfer system including
a heat source unit in which heat is configured to be exchanged between a heat transfer medium and a heat source,
a utilization unit in which heat is configured to be exchanged between the heat transfer medium and a temperature adjustment target,
a first flow path that connects the heat source unit and the utilization unit and through which the heat transfer medium is configured to flow from the heat source unit to the utilization unit,
a pump configured to circulate the heat transfer medium in the first flow path,
a second flow path that connects the heat source unit and the utilization unit and through which the heat transfer medium is configured to flow from the utilization unit to the heat source unit, and
a compressor configured to circulate the heat transfer medium in the second flow path,
the method comprising:
using, as the heat transfer medium, inorganic hydrate slurry in which an inorganic hydrate that absorbs heat when dissolved in water is mixed with water; and
controlling the heat transfer system, including controlling the pump and/or the compressor, so that a temperature of the heat transfer medium flowing through the first flow path and a temperature of the heat transfer medium flowing through the second flow path become equal to or below a melting point of the inorganic hydrate;
wherein
an amount of the inorganic hydrate dissolved per unit mass of water in the heat transfer medium flowing through the first flow path is different from an amount of the inorganic hydrate dissolved per unit mass of water in the heat transfer medium flowing through the second flow path.

2. The heat transfer method according to claim 1, comprising
transferring cold heat from the heat source unit to the utilization unit.

3. The heat transfer method according to claim 2, comprising
using, as the heat transfer medium, phosphoric acid-based inorganic hydrate slurry in which a phosphoric acid-based inorganic hydrate is mixed with water.

4. The heat transfer method according to claim 3, wherein the phosphoric acid-based inorganic hydrate is disodium hydrogenphosphate dodecahydrate, and
a weight concentration of disodium hydrogenphosphate in the phosphoric acid-based inorganic hydrate slurry is in a range of from 2% to 7%, and the method comprising
controlling the heat transfer system so that a temperature of the heat transfer medium flowing into the utilization unit from the first flow path is in a range of from 2° C. to 6° C., and a temperature of the heat transfer medium flowing out from the utilization unit to the second flow path is in a range of from 15° C. to 19° C.

5. The heat transfer method according to claim 4, wherein a diameter of a pipe forming the first flow path is larger than a diameter of a pipe forming the second flow path.

6. The heat transfer method according to claim 4, comprising
adding an additive, which improves dispersibility of crystals of the phosphoric acid-based inorganic hydrate, to the heat transfer medium.

7. The heat transfer method according to claim 4, wherein the utilization unit includes a utilization heat exchanger in which heat is exchanged between the heat transfer medium and the temperature adjustment target, and
at least one of an inner surface of the first flow path, an inner surface of the second flow path, and an inner surface of a flow path of the utilization heat exchanger through which the heat transfer medium flows includes an area in which a hydrophilic face and a hydrophobic face are alternately arranged.

8. The heat transfer method according to claim 3, comprising
adding an additive, which improves dispersibility of crystals of the phosphoric acid-based inorganic hydrate, to the heat transfer medium.

9. The heat transfer method according to claim 8, wherein
the additive is sodium dodecyl sulfate that is a surfactant, and a mass percent concentration of which is in a range of from 0.1 wt % to 1 wt % relative to the heat transfer medium.

10. The heat transfer method according to claim 8, wherein
the additive is sodium octyl sulfate, sodium decyl sulfate, sodium hexadecyl sulfate, sodium stearyl sulfate, or sodium octadecyl sulfate.

11. The heat transfer method according to claim 8, wherein
the additive is an antifreeze protein.

12. The heat transfer method according to claim 8, wherein
the additive is an alternative substance to an antifreeze protein.

13. The heat transfer method according to claim 8, wherein
the additive is a titanium oxide nanosheet.

14. The heat transfer method according to claim 3, wherein
a diameter of a pipe forming the first flow path is larger than a diameter of a pipe forming the second flow path.

15. The heat transfer method according to claim 3, wherein
the utilization unit includes a utilization heat exchanger in which heat is exchanged between the heat transfer medium and the temperature adjustment target, and
at least one of an inner surface of the first flow path, an inner surface of the second flow path, and an inner surface of a flow path of the utilization heat exchanger through which the heat transfer medium flows includes an area in which a hydrophilic face and a hydrophobic face are alternately arranged.

16. The heat transfer method according to claim 2, wherein
a diameter of a pipe forming the first flow path is larger than a diameter of a pipe forming the second flow path.

17. The heat transfer method according to claim 16, wherein
in a case where a rated cooling capacity of the utilization unit is greater than 2.2 kW and equal to or less than 5.6 kW, an outer diameter of the pipe forming the first flow path is 12.7 mm, and an outer diameter of the pipe forming the second flow path is 6.4 mm,
in a case where the rated cooling capacity of the utilization unit is greater than 5.6 kW and equal to or less than 14 kW, the outer diameter of the pipe forming the first flow path is 15.9 mm, and the outer diameter of the pipe forming the second flow path is 9.5 mm,
in a case where the rated cooling capacity of the utilization unit is greater than 14 kW and equal to or less than 22.4 kW, the outer diameter of the pipe forming the first flow path is 19.1 mm, and the outer diameter of the pipe forming the second flow path is 9.5 mm,
in a case where the rated cooling capacity of the utilization unit is greater than 22.4 kW and equal to or less than 28 kW, the outer diameter of the pipe forming the first flow path is 22.2 mm, and the outer diameter of the pipe forming the second flow path is 9.5 mm,
in a case where the rated cooling capacity of the utilization unit is greater than 28 kW and equal to or less than 40 kW, the outer diameter of the pipe forming the first flow path is 25.4 mm, and the outer diameter of the pipe forming the second flow path is 12.7 mm,
in a case where the rated cooling capacity of the utilization unit is greater than 40 kW and equal to or less than 45 KW, the outer diameter of the pipe forming the first flow path is 28.6 mm, and the outer diameter of the pipe forming the second flow path is 12.7 mm,
in a case where the rated cooling capacity of the utilization unit is greater than 45 kW and equal to or less than 69 kW, the outer diameter of the pipe forming the first flow path is 28.6 mm, and the outer diameter of the pipe forming the second flow path is 15.9 mm,
in a case where the rated cooling capacity of the utilization unit is greater than 69 kW and equal to or less than 100 KW, the outer diameter of the pipe forming the first flow path is 31.8 mm, and the outer diameter of the pipe forming the second flow path is 19.1 mm, and
in a case where the rated cooling capacity of the utilization unit is greater than 100 kW and equal to or less than 150 kW, the outer diameter of the pipe forming the first flow path is 38.1 mm, and the outer diameter of the pipe forming the second flow path is 19.1 mm.

18. The heat transfer method according to claim 16, wherein
the utilization unit includes a utilization heat exchanger in which heat is exchanged between the heat transfer medium and the temperature adjustment target, and
at least one of an inner surface of the first flow path, an inner surface of the second flow path, and an inner surface of a flow path of the utilization heat exchanger through which the heat transfer medium flows includes an area in which a hydrophilic face and a hydrophobic face are alternately arranged.

19. The heat transfer method according to claim 2, wherein
the utilization unit includes a utilization heat exchanger in which heat is exchanged between the heat transfer medium and the temperature adjustment target, and
at least one of an inner surface of the first flow path, an inner surface of the second flow path, and an inner surface of a flow path of the utilization heat exchanger through which the heat transfer medium flows includes an area in which a hydrophilic face and a hydrophobic face are alternately arranged.

20. The heat transfer method according to claim 1, wherein
the utilization unit includes a utilization heat exchanger in which heat is exchanged between the heat transfer medium and the temperature adjustment target, and
at least one of an inner surface of the first flow path, an inner surface of the second flow path, and an inner surface of a flow path of the utilization heat exchanger through which the heat transfer medium flows includes an area in which a hydrophilic face and a hydrophobic face are alternately arranged.

* * * * *